United States Patent
Leiber et al.

(10) Patent No.: US 10,688,979 B2
(45) Date of Patent: Jun. 23, 2020

(54) BRAKE SYSTEM WITH FLOATING PISTON-MAIN BRAKE CYLINDER UNIT WITH A NOVEL TYPE OF MUX CONTROL (MUX 2.0) WITH AT LEAST ONE OUTLET VALVE, AND METHOD FOR REGULATING PRESSURE

(71) Applicant: IPGATE AG, Pfäffikon (CH)

(72) Inventors: Heinz Leiber, Oberriexingen (DE);
Thomas Leiber, Munich (DE);
Christian Köglsperger, Geretsried (DE)

(73) Assignee: IPGATE AG, Präffikon (CH)

( * ) Notice: Subject to any disclaimer, the term of this patent is extended or adjusted under 35 U.S.C. 154(b) by 163 days.

(21) Appl. No.: 15/558,376

(22) PCT Filed: Dec. 30, 2015

(86) PCT No.: PCT/EP2015/081401
§ 371 (c)(1),
(2) Date: Feb. 12, 2018

(87) PCT Pub. No.: WO2016/146222
PCT Pub. Date: Sep. 22, 2016

(65) Prior Publication Data
US 2018/0215366 A1    Aug. 2, 2018

(30) Foreign Application Priority Data

Mar. 16, 2015 (DE) .................... 20 2015 107 072 U
Mar. 16, 2015 (DE) .................... 20 2015 107 075 U
(Continued)

(51) Int. Cl.
*B60T 13/68* (2006.01)
*B60T 8/40* (2006.01)
(Continued)

(52) U.S. Cl.
CPC .............. *B60T 13/686* (2013.01); *B60T 7/04* (2013.01); *B60T 8/17* (2013.01); *B60T 8/176* (2013.01);
(Continued)

(58) Field of Classification Search
CPC ... B60T 7/04; B60T 8/17; B60T 8/176; B60T 8/4022; B60T 8/4077; B60T 8/4081;
(Continued)

(56) References Cited

U.S. PATENT DOCUMENTS 6,007,161 A    12/1999  Worsdorfer
6,231,131 B1 *  5/2001  Dinkel .................... B60T 8/348
                                                 303/113.2
(Continued)

FOREIGN PATENT DOCUMENTS

DE    19601268 A1    7/1997
DE    19601417 A1    7/1997
(Continued)

OTHER PUBLICATIONS

Int'l Search Report dated Feb. 14, 2017 in Int'l Application No. PCT/EP2015/081402.
(Continued)

*Primary Examiner* — Thomas W Irvin
(74) *Attorney, Agent, or Firm* — Panitch Schwarze Belisario & Nadel LLP

(57) ABSTRACT

A brake system for motor vehicles may have a main brake cylinder with a floating piston arranged therein, which hermetically seals first and second pressure chambers from one another. The first pressure chamber may be hydraulically connected to a first brake circuit, and the second pressure chamber may be hydraulically connected to a second brake circuit. The brake system may further include a pressure means reservoir under atmospheric pressure,
(Continued)

wheel brakes, an electrically controllable pressure supply device for pressure build-up and pressure reduction in the wheel brakes, a valve block with a currentless open inlet valve/switching valve for each wheel brake and with at least one outlet valve, wherein each wheel brake can be hydraulically connected via the switching valve associated with it to a pressure chamber of the main brake cylinder.

39 Claims, 14 Drawing Sheets

(30) Foreign Application Priority Data

Mar. 16, 2015 (DE) .................. 20 2015 107 079 U
Apr. 21, 2015 (DE) .................. 20 2015 107 081 U

(51) Int. Cl.
| | | |
|---|---|---|
| *B60T 13/74* | (2006.01) | |
| *B60T 7/04* | (2006.01) | |
| *B60T 8/17* | (2006.01) | |
| *B60T 8/176* | (2006.01) | |
| *B60T 13/58* | (2006.01) | |
| *B60T 17/22* | (2006.01) | |
| *B60T 8/32* | (2006.01) | |
| *B60T 11/16* | (2006.01) | |

(52) U.S. Cl.
CPC .......... *B60T 8/4022* (2013.01); *B60T 8/4077* (2013.01); *B60T 8/4081* (2013.01); *B60T 13/58* (2013.01); *B60T 13/745* (2013.01); *B60T 17/22* (2013.01); *B60T 8/326* (2013.01); *B60T 11/165* (2013.01); *B60T 2270/10* (2013.01); *B60T 2270/404* (2013.01); *B60T 2270/82* (2013.01)

(58) Field of Classification Search
CPC ........ B60T 8/326; B60T 13/58; B60T 13/686; B60T 13/745; B60T 17/22; B60T 11/165; B60T 2270/10; B60T 2270/404; B60T 2270/82
See application file for complete search history.

(56) References Cited

U.S. PATENT DOCUMENTS

| | | | |
|---|---|---|---|
| 9,108,604 B2* | 8/2015 | Bohm | B60T 8/4081 |
| 9,205,821 B2* | 12/2015 | Biller | B60T 8/4081 |
| 9,399,452 B2* | 7/2016 | Roll | B60T 8/326 |
| 9,566,960 B2* | 2/2017 | Feigel | B60T 8/36 |
| 9,876,416 B2* | 1/2018 | Eckert | H02K 1/243 |
| 10,112,592 B2* | 10/2018 | Leiber | B60T 13/745 |
| 2012/0061192 A1 | 3/2012 | Birkheim | |
| 2014/0333124 A1 | 11/2014 | Koo | |
| 2015/0028667 A1* | 1/2015 | Leiber | B60T 13/662 303/15 |
| 2015/0061854 A1* | 3/2015 | Drumm | B60T 7/042 340/453 |
| 2015/0069828 A1 | 3/2015 | Ueno et al. | |
| 2015/0375726 A1* | 12/2015 | Roll | B60T 8/4081 303/3 |
| 2018/0126971 A1* | 5/2018 | Leiber | B60T 7/042 |
| 2019/0031165 A1* | 1/2019 | Besier | B60T 13/686 |

FOREIGN PATENT DOCUMENTS

| | | |
|---|---|---|
| DE | 102009043484 A1 | 3/2011 |
| DE | 102011077329 A1 | 1/2012 |
| DE | 102011118365 A1 | 5/2013 |
| DE | 102012002791 A1 | 8/2013 |
| DE | 102013203594 A1 | 9/2013 |
| DE | 102013222061 A1 | 9/2014 |
| DE | 102013224313 A1 | 9/2014 |
| WO | 2003038246 A2 | 5/2003 |

OTHER PUBLICATIONS

Written Opinion dated Feb. 14, 2017 in Int'l Application No. PCT/EP2015/081402.
Int'l Search Report dated Aug. 1, 2016 in Int'l Application No. PCT/EP2015/081403.
Written Opinion dated Aug. 1, 2016 in Int'l Application No. PCT/EP2015/081403.
Int'l Preliminary Report of Patentability fated Sep. 19, 2017 in Int'l Application No. PCT/EP2015/081402.
Int'l Preliminary Report on Patentability dated Sep. 19, 2017 in Int'l Application No. PCT/EP2016/055703.
Int'l Search Report dated Jul. 28, 2016 in Int'l Application No. PCT/EP2016/055703.
Int'l Preliminary Report on Patentability dated Sep. 19, 2017 in Int'l Application No. PCT/EP2015/081403.
Int'l Preliminary Report of Patentability dated Sep. 19, 2017 in Int'l Application No. PCT/EP2015/081401.
Int'l Search Report dated Feb. 27, 2017 in Int'l Application No. PCT/EP2015/081401.
Written Opinion dated Feb. 27, 2017 in Int'l Application No. PCT/EP2015/081401.

* cited by examiner

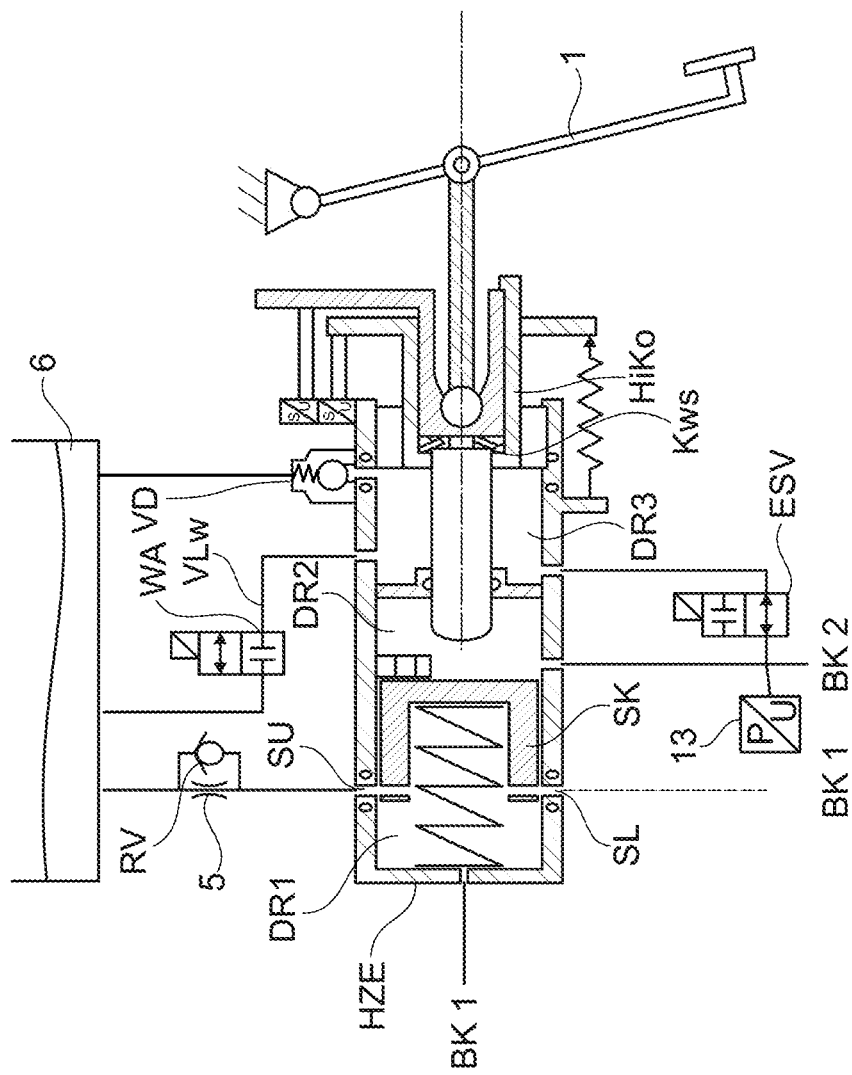
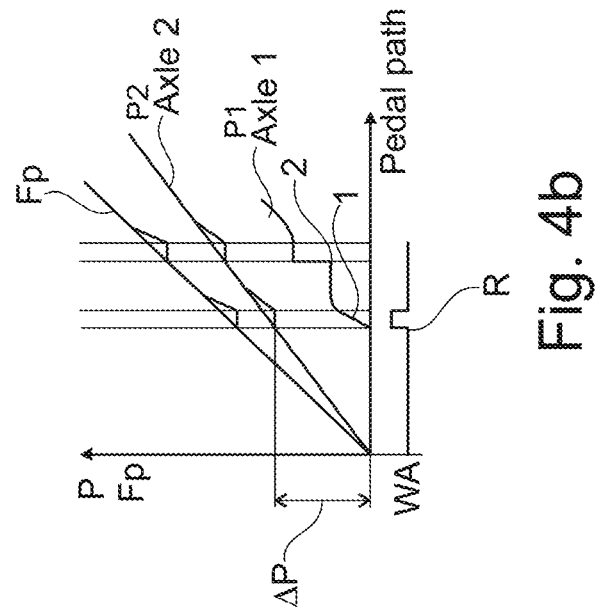
Fig. 4a
Fig. 4b

BRAKE SYSTEM WITH FLOATING PISTON-MAIN BRAKE CYLINDER UNIT WITH A NOVEL TYPE OF MUX CONTROL (MUX 2.0) WITH AT LEAST ONE OUTLET VALVE, AND METHOD FOR REGULATING PRESSURE

CROSS-REFERENCE TO RELATED APPLICATION

This application is a Section 371 of International Application No. PCT/EP2015/081401, filed Dec. 30, 2015, which was published in the German language on Sep. 22, 2016 under International Publication No. WO 2016/146222 A3, which claims priority under 35 U.S.C. § 119(b) to German Patent Application No. 20 2015 107 079.9, filed Mar. 16, 2015, German Patent Application No. 20 2015 107 075.6, filed Mar. 16, 2015, German Patent Application No. 20 2015 107 072.1, filed Mar. 16, 2015, and German Patent Application No. 20 2015 107 081.0, filed Apr. 21, 2015, the disclosure of which are incorporated herein by reference in their entirety.

The invention relates to an actuating device for at least one hydraulically actuatable device, in particular a vehicle brake system.

PRIOR ART

WO2006/111392A1 and WO2010/091883 A1 disclose brake systems in which, in ABS mode, the pressure in the wheel brakes is adjusted simultaneously or successively in a closed multiplex process. This takes place via a switching valve as well as via the path pilot control of a position-controlled piston for pressure build-up and pressure reduction taking into account the pressure volume characteristic of each individual wheel brake. Preferably, switching valves with low flow resistance are used in the hydraulic connection to the wheel brake. The pressure can thereby be varied sequentially or simultaneously or partly simultaneously in one or more wheel brakes. A pressure sensor that measures the pressure at a point in the hydraulic connection between the piston-cylinder unit and wheel brakes is used for the control. In a preferred implementation it is mounted close to the piston-cylinder unit. This method is hereinafter referred to as the MUX method.

The advantage of this MUX process is a very precise pressure regulation, especially with low friction values and with recovery/blending. In addition, the expenditure on valves can be significantly reduced, since instead of one inlet valve and one outlet valve per wheel brake, only one switching valve is required. A disadvantage of the brake systems known from these two documents are the high demands placed on the electric motor. Thus, this must have inter a/ia a low inertial mass and a high torque for reversing operation.

A brake system is previously known from DE 10 2012 002 791 A1, the basic construction of which with main brake cylinder and isolating valves is known on the market as MKC1, as is described for example in DE 10 2013 224 313 A1. With this brake system the multiplex mode is designed in such a way that both the main brake cylinder and the pressure supply unit are each connected via isolating valves to the brake circuits.

The advantage of this arrangement is the modular construction and the use of standard components (main brake cylinder), as well as the use of a pressure supply unit, which can be installed as a module. In this arrangement there are no differential pressures in the brake circuits, since the pressure supply unit is connected to the brake circuits via the same isolating valves. Here there is no interconnection of a piston for media separation, and therefore there are no differential pressures between the two brake circuits. However, the high cost of components is a disadvantage. Thus, inter a/ia, a large number of valves, an expensive main brake cylinder with two chambers and a simulator are required. The system suffers from a critical fail safety of the main brake cylinder, in particular on account of the fault-critical design of the path simulator and the fact that the floating piston moves only slightly during pedal actuation.

A fail-safe design of the main brake cylinder envisages corresponding valve circuits for the path simulator (disconnection in the fall-back situation, function valves, feed-in at the fall-back level) as well as isolating valves to the brake circuits for decoupling the pedal in the brake-by-wire operation. Reference is made here to DE 10 2010 081463 A1, DE 10 2013 224 313 A1, WO 2012/034661 and DE 10 2013 216 477 A1. In particular, the main brake cylinder design in WO 2012/034661 is characterised by a very good fail safety and short pedal paths in the event of a system failure. The advantageous embodiment with three hydraulic chambers (pressure piston chamber, floating piston chamber, auxiliary piston chamber) is described in detail in WO 2012/034661 and has been comprehensively adopted in DE 10 2013 216 477. The disadvantage of the three-chamber system is the high expenditure and the unfavourable installation length in serial arrangement.

DE 2014120218271700 A1 describes an extension for the MKC1 brake system with MUX control, which is previously known from DE 10 2012 002 791 A1. The extension comprises a novel double stroke piston pressure supply unit, which permits a pressure regulation in the forward and return stroke as well as a switching over of hydraulic cross-sectional surfaces. The advantage of this embodiment is the continuous conveyance through the pressure generating unit, which is advantageous in ABS operation and leakages and in the event of fading.

OBJECT OF THE INVENTION

The object of the present invention is to provide a cost-effective and compact short design brake system with high error safety and control quality, which can operate with as few valves and pressure transducers and/or sensors as possible.

Achievement of the Object

The object of the invention may be achieved with a brake system having various features as recited in the attached claims.

An actuating system is provided by the invention, which is characterised by high pressure regulating quality, degrees of freedom in the implementation of innovative recovery strategies, and a reduction of the requirements placed on the drive unit.

This is achieved with a compact design brake system with a novel pressure regulation/pressure control, characterised in addition to the pressure regulation by a novel design of the pressure generating unit (double stroke piston, differential piston) and also a simple construction of the main brake cylinder with a floating piston with two pressure chambers. In addition, a fail-safe path simulator based on the auxiliary piston concept known from WO 2012/034661 with feed via a currentless open valve is realised in various variants.

The brake system according to the invention is based on the following basic ideas:

- short design main brake cylinder unit with a floating piston and auxiliary piston;
- pressure build-up in MUX operation and pressure reduction in MUX operation and/or with time control via at least one outlet valve;
- precise pressure-controlled pressure reduction by means of pressure measurement via pressure transmitter via pressure supply unit and valves that connect the pressure supply unit to the reservoir (double stroke piston with PD1, PD3 valve).
- simple design with few valves (with small throttling effect);
- use of the current measurement of the electric motor for indirect pressure measurement in a brake circuit in which no pressure sensor is installed;
- novel design of the pressure generating unit in the implementation as a double stroke piston or stage piston with pre-filling effect and controlled pressure reduction via the pressure generating unit;
- intelligent use of the double stroke piston for configuring a double circuit pressure supply;
- design of the pedal interface and the auxiliary piston path simulator principle.

The brake system according to the invention is based in particular on a novel multiplex method that is expanded via pressure reduction control via one or more outlet valve(s). In this way pressure can be reduced in another brake circuit/wheel by means of time control, while pressure can be increased or decreased in another brake circuit/wheel circuit in MUX operation. In this connection the pressure reduction is effected via time control of the outlet valves, in which predominantly the pressure change required by the regulator or the control device, the differential pressure and the pressure volume characteristic of the wheel cylinder are taken into account. The brake circuit is thus briefly opened, which is required in particular in extreme situations (e.g. p-split, high p-braking). The multiplexer can in this way be greatly relieved. Also the requirements on the motor can thereby be reduced.

The pressure can be individually reduced in a controlled manner in one or two wheel circuits by using one or two outlet valves. Preferably the outlet valves are used only in one wheel circuit of a brake circuit, in particular in order to simplify the control in this brake circuit. At the same time the pressure can be increased or decreased in a controlled manner in another wheel circuit via MUX via volume control with p-V characteristic. In this case a corresponding priority control of the MUX is used. In order to assist the method a pressure sensor is used for the pressure determination in a brake circuit, and the pressure in another brake circuit can be determined indirectly by isolating by means of an isolating valve via the known method via phase current measurement of the electric motor. With a known cross-sectional area of the main brake cylinder, gear ratio, the pressure can be calculated via the proportional relationship between phase current and torque of the electric motor. The accuracy can be increased by additionally determining the temperature in the electric motor via a simple temperature transducer and the non-linear course of the torque constant kt. A stationary piston is advantageous for thus purpose, since the pressure estimation can in addition be calibrated.

The isolating valve of the pressure supply unit to the brake circuit BK I (safety requirement brake system: disconnection of the pressure supply unit in the event of a fault and 2-circuit access of the main brake cylinder to the brake circuits) can be saved, wherein the pressure supply via the sniffing hole of the floating piston to the pressure chamber DR1 takes place at the inlet valves of the brake circuit I and the connection to the pressure supply unit is blocked in the fall-back situation. For this purpose it is necessary that the floating piston remains in the end position with stop in normal operation. The pressure of the pressure generating unit in both pressure chambers DR1 and DR2 is therefore changed (approximately equal pressure in both brake circuits) and the pressure piston is forced with a restoring spring against a stop. The system should appropriately be operated so that the pressure in the pressure chamber DR1 is at least as large as the pressure in the pressure chamber DR2, and in addition a restoring spring assists so that no movement takes place even under pressure oscillations. If the pressure reduction results in a closing process of the sniffing hole, the pressure reduction in DR1 must be assisted by opening the isolating valve and retracting the plunger. Diagnostic methods are possible, which check the tightness of the pressure piston seals. This can be achieved by specifically setting a pressure difference (e.g. delayed pressure build-up, targeted pressure reduction with differential pressures). This should preferably be done when the vehicle is stationary.

A reasonable extension is the direct connection of the pressure generating unit to both inlet valves of the brake circuit brake via an isolating valve/diagnostic valve (TV1, FIG. 1b) or to one isolating valve per wheel brake. Also useful is a combination, i.e. direct connection of the pressure supply to the main brake cylinder (DR1) and additional connection with the switching valves with an isolating valve (FIG. 1b). This has additional safety advantages. On the one hand the pressure supply unit can be reliably isolated from the brake circuit in the fall-back situation, and in addition a diagnosis of the main brake cylinder can be carried out more easily. It is therefore important that the seals in the main brake cylinder and the mobility of the pressure piston are checked at regular intervals during standstill.

Due to the direct pressure feed into the second pressure chamber DR1 or preferably additional feeding via an isolating valve TV between the pressure generating unit and switching valves, the system can be significantly reduced as regards the throttling action compared to the system according to the prior art with isolating valves between the pressure supply unit and the wheel brakes (see DE 10 2013 224 313 A1), and large size isolating valves can be saved. Therefore at least the first BK I is operated in the multiplex mode (pressure build-up and pressure reduction primarily via path control of the piston of the pressure generating unit via the pressure volume characteristic), which requires low throttle resistances to the brake circuits. This is helpful particularly when using large-volume consumers (e.g. front axle in black-and-white subdivision).

The MUX operation allows the use of special switching valves of large cross-section, since the volume control is mainly used for the pressure control and therefore places smaller requirements on valves compared to valves that are operated in time control. The time control in conventional systems requires only small valve cross-sections at high pressure differences and restriction of the flow amounts, since the valve tolerances cause too large a deviation in the pressure amplitudes.

Valves are provided on the wheel brakes (switching valves, outlet valves) with special through-flow. In this way the multiplexing operation can be implemented very efficiently and cost-effectively, and the great advantages of the pressure control accuracy in particular at low friction values (fully flexible recovery and operation with braking force intensification in normal operation) can be utilised without high additional costs. For a pure multiplex operation the dynamic demand on the electric motor of the pressure generating unit is very high in order to cover limiting cases. This leads to a high torque requirement in the operation of 4 wheel brake cylinders. The outlet valves provided in the invention and the temporary pressure reduction into the reservoir relieve the motor especially in extreme situations. This leads in particular in braking situations at high friction values to shorter braking distances and relieves the reversibility of the pressure generating unit, and allows the use of a motor with low torque and therefore lower costs.

In the brake system according to the invention the use of a differential piston or double stroke piston in the pressure generating unit is advantageous, with which pressure can be built up and reduced in the multiplex operation. In particular in the case of the double stroke piston the use of a pressure-relief valve (PD1 and/or PD3, FIGS. 3a-3c) is expedient, so that the brake system between the wheel brake and the pressure generating unit is largely closed and the pressure reduction can thus take place quietly also at high pressures. Both variants have the same effect, namely that the torque demand at high pressures is reduced by changing the hydraulically active surfaces. At the same time a pre-charging effect can be achieved, i.e. owing to a larger volume flow through a larger effective area at low pressures a very fast braking can be achieved and air play on the lining can be overcome.

The differential piston pressure generator (FIG. 2a, 2b) is expanded by two valves as a pressure generator (ShV and PDI) compared to the system with single-stroke pistons. If the valve ShV is opened, the volume of a second hydraulic piston is conveyed to the brake. When the valve ShV is closed and a second valve PD1 is opened, the volume is discharged into the reservoir and thus only a hydraulic surface is active. Thus, with 2 further valves the drive motor of the system can be significantly downsized.

In the embodiment of the pressure generating unit as a double stroke piston (FIG. 3a-FIG. 3c) the same effect of the hydraulic switching as in the case of the differential piston is achieved, in which the double stroke piston is operated in the return stroke. In addition, the front and rear chambers of the piston of the pressure supply device can be connected in the forward stroke via a switching valve (ShV) or via the isolating valves (TV2 and TV2b), whereby a smaller hydraulic surface is active in the pressure build-up. If the double stroke piston is retracted, the pressure in both brake circuits can be reduced by opening a pressure relief valve PDI. A quiet pressure reduction is thus possible. By means of optimised control the opening of the isolating valve can also be assisted at high differential pressures (brake circuit pressure compared to pressure in the double stroke piston), in which the double stroke piston builds up pressure by means of movement and allows the isolating valves to be opened at low differential pressures. This enables a downsizing/cost reduction of the isolating valves (design for high flow rates and low differential pressures).

The system construction with DHK also enables a brake circuit BK I to be connected directly to the pressure generating unit, because in the event of a fault the sniffing hole is covered by the movement of the floating piston and the pressure supply unit is disconnected (FIG. 3a). The brake circuit II is required via two isolating valves TV2, TV2b of the forward stroke chamber and return stroke chamber for the brake circuit II. The brake circuit BK I is thus ideally suited for multiplexing since the throttle resistances are very low, and at least one outlet valve is additionally arranged in the brake circuit II. For the multiplex control and the pressure-controlled pressure reduction in BK I, the pressure calculation from the phase current is expediently used.

Alternatively, the DHK can be separated via TV1 to the BK1 and TV2 to the BK2. The return stroke is separated by a further valve TV2b. This embodiment allows the floating piston to move and no overshooting of the sniffing hole leads to a separation of the pressure supply. An operation is thus also allowable in which the pressure in the pressure chamber DR1 is significantly lower than in DR2 (e.g. recovery operation). In addition, the mobility of the floating piston can easily be diagnosed during operation.

By using a double stroke piston the pressure supply can be implemented as a two-circuit supply (FIG. 3c). In the forward stroke of the piston the separation takes place via the isolating valve TV2 to BK II via the floating piston to BK I. In contrast to the other implementations the floating piston is movably controlled.

The pressure build-up takes place via both directions of movement, since the SK piston transfers the pressure from one brake circuit to the other. For certain functions, such as ABS, a pressure equalisation is effected via the bypass valve ShV, so during volume conveyance the floating piston is no longer moved by the double stroke piston. By means of a floating piston path sensor or position detection the SK piston can be controlled in a certain position by a corresponding valve switch, so that the position of the floating piston in the fall-back situation is known. This embodiment is therefore particularly suitable for high safety requirements on double circuit systems of the pressure supply for autonomous driving.

In the return stroke, only pressure can be built up when the valve PD1 is closed. This operation is preferably only used if the pressure has to be raised significantly above the normal operating level, as is the case for example in fading.

The pressure reduction is then performed either via the piston return stroke, the pressure-controlled pressure reduction by means of pressure measurement via the pressure transducer via the pressure supply unit, as well as via valves that connect the pressure supply unit (double stroke piston) to the reservoir (i.e. PD3, PD1), or by opening one or more outlet valves AV.

The pressure reduction via a piston return stroke then takes place in normal braking force booster operation up to pressures close to the blocking pressure, and the pressure reduction is performed via PD3, PD1 during pressure reduction from high pressures, especially after fading or at the end of ABS control processes. The pressure reduction via the outlet valves is primarily used in ABS operation, preferably at high dynamics requirements.

To reduce noise the pressure reduction can be influenced via the piston, so that pressure oscillations are avoided and a smooth transient oscillation to a target pressure level is achieved. At low pressures and for the path simulator control (FIG. 4b) the pressure can also be regulated via a pressure control in the open brake circuit, as is described and illustrated in FIGS. 6a-6c. At high pressures this method should be avoided for noise reasons.

The method of pressure control via the pressure volume characteristic is preferably used in the system (FIG. 6a to FIG. 6c), since compared to the prior art it is now also designed for operation with open outlet valves open or leakages in valves. In addition, only the pressure in one brake circuit can be built up by disconnection via an isolating valve, while a pressure reduction takes place in the other brake circuit. After the pressure reduction there is a volume loss independent of the method, i.e. a travel offset has to be taken into account for the control via the pressure volume characteristic only for a further pressure build-up/pressure reduction. This is carried out by assigning the pressure volume characteristic to a path position via the use of a pressure transducer. Particularly advantageous for the expanded method of pressure regulation is the use of the double stroke piston, which permits a continuous conveyance and also a positioning of the piston in the correct position (forward stroke end position) for the further pressure reduction in the closed brake circuit.

The short designed main brake cylinder unit is thereby created, in which instead of the usual arrangement with three pistons (WO 2012/034661), only two pistons are required. This is achieved in that an auxiliary piston operates the path simulator as well as a brake circuit BK1 in the fall-back situation via a feed valve, and displaces the pressure piston DK via a plunger and conveys volume into the BK2. The construction compared to a three-piston solution (WO 2012/034661) is thereby significantly simplified, with the same failure safety. The failure safety is ensured by the fact that the feed is effected reliably with a current-free open valve (ESV) in the event of a system failure, and a mechanical intervention is also possible via a pressure plunger.

Furthermore, the path simulator can be simplified in one embodiment (FIGS. 4a and 4b), in which the plunger acts on the pressure chamber DR2 and generates a pressure-proportional feedback reaction corresponding to the pressure, as in the case of a conventional brake system (ESP, iBooster). This leads also to a pedal response in the regulating operation and in the case of fading, which is desired from the point of view of the automobile manufacturer. In normal operation the brake pressure acts on the pedal plunger and generates a pressure-proportional force on the brake pedal. In this case the auxiliary piston in the path simulator unit is unpressurised and the volume is fed via a WA valve to the reservoir. The ESV valve is closed.

In ABS operation the pedal characteristics can be changed by opening the ESV valve and the pedal can be stiffened by closing the WA valve. A different pedal travel force characteristic can be adjusted in this way. In addition, a pulsing response to the pedal similar to the present-day ABS is possible by pulsing the WA valve.

The path simulator piston can even be completely omitted if a corresponding plunger is suitably dimensioned as regards diameter. In addition, in this embodiment the pressure transducer of the brake circuit II can be used to determine the driver's foot pressure, and a force-path sensor can be dispensed with via a differential path measurement.

The system with auxiliary piston also offers possibilities for a path simulator brake system with very little or no response feedback. This is shown in FIGS. 4 and 5. Such a path simulator system is desired for vehicles with strong recovery control. A response in the ABS mode is then low or has to be regulated via PWM control of the feed-in valve ESV. Fading states cannot be reported in this way to the driver.

The operation of the brake system is understood to refer to normal brake force booster mode in the context of the invention, in which no ABS function, ESP function, blending or recovery is performed.

The system in its embodiments thus provides a modular system for all classes and types of vehicles and is characterised by an extremely short structural length and very low costs.

Possible embodiments of the brake system according to the invention are explained in more detail hereinafter with the aid of the drawings, in which:

FIG. 1a: shows an embodiment of the brake system according to the invention with single-stroke pistons and multiplexer with at least 1 outlet valve and a maximum of 4 outlet valves and brake circuit isolation via floating pistons FIG. 1b: shows an embodiment of the brake system according to the invention with single-stroke piston and multiplexer with outlet valves in a brake circuit and brake circuit isolation via floating pistons and isolating valve FIG. 1c: shows an embodiment of the brake system according to the invention with single-stroke piston and multiplexer with an outlet valve in a brake circuit and pressure reduction via reservoir in the closed system FIG. 2a: shows an embodiment of the brake system according to the invention with stepped stroke piston and multiplexer with one or two outlet valves in both brake circuits FIG. 2b: shows an embodiment of the brake system according to the invention with step-stroke piston and multiplexer with one or two outlet valves and combination of a chamber 1 with BK II and chamber 2 with BK I via ShV FIG. 3a: shows an embodiment of the brake system according to the invention with double-stroke piston (single circuit) and multiplexer with outlet valves with stationary floating piston during pressure build-up and reduction in the forward stroke and movement on switching to pressure build-up in the return stroke FIG. 3b: shows an embodiment of the brake system according to the invention with double-stroke piston (single circuit) and multiplexer with outlet valves with stationary floating piston during pressure build-up and reduction in the forward stroke and movement on switching to pressure build-up in the return stroke FIG. 3c: shows an embodiment of the brake system according to the invention with double-stroke pistons (two circuit) and multiplexer with outlet valves with movable floating piston in the forward and return stroke during pressure build-up and pressure reduction FIG. 4: shows a plunger path simulator with KWS control, feed valve and mechanical access FIG. 5a: shows a plunger path simulator with KWS control, with path simulator piston with feed valve and mechanical access, pressure decoupling via VST valve FIG. 5b: shows a pressure-decoupled path simulator with path simulator piston, mechanical access, empty path in the dry area and feed valve FIG. 5c: shows a further configuration according to an aspect of the disclosure FIG. 6a: shows pressure-volume control in the closed brake circuit (AV, ZV closed)

FIG. 6b: shows controlled regulation of the pressure reduction in the open brake circuit FIG. 6c: is a block diagram of the regulator during pressure regulation in the closed and open brake circuit

Figure 1A:
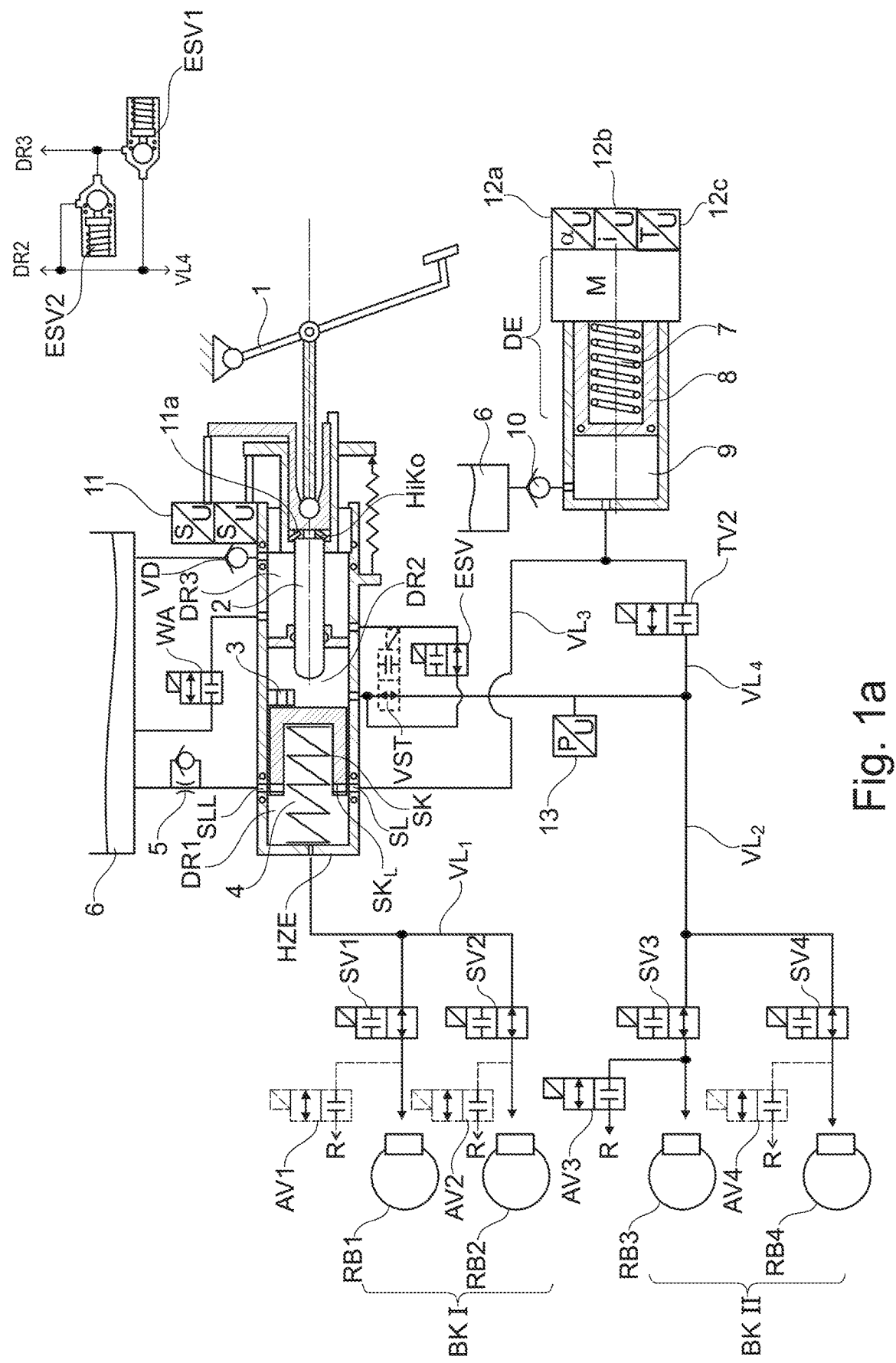
FIG. 1 a shows a first embodiment of the brake system according to the invention with single-stroke piston and multiplexer according to the invention. The brake pedal 1 actuates a path simulator in a first embodiment according to FIG. 4a (consisting of an auxiliary piston HiKo, a connecting valve WA with reservoir and a plunger 2). The plunger 2 projects into a pressure chamber DR 2 of a main brake cylinder unit HZE consisting of a floating piston SK, pressure chambers DR 1 and DR 2 and a pressure piston stop 3 as well as a restoring spring 4. The plunger 2 is sealed tight to the auxiliary piston. The main brake cylinder unit HZE is connected to a reservoir 6 via a non-return valve and diaphragm 5. Both pressure chambers DR 1 and DR 2 are connected to the pressure generating unit DE and to one brake circuit BK I, BK II. The pressure chamber DR 2 is connected with the normally open switching valves SV 3, SV 4 to the wheel brake RB 3, RB 4, and also directly to the pressure supply unit. The pressure chamber DR 1 is connected with the normally open switching valves SV1, SV2 to the wheel brake RB1, RB2 and is also connected to the pressure supply unit via an isolating valve. In addition an outlet valve AV3 is arranged between a wheel brake and a switching valve (SV3) in a brake circuit (BK II).

The control of the system is performed primarily according to the multiplex (MUX) method described in the prior art for pressure build-up and pressure reduction. The outlet valve AV3 in FIG. 1a compulsorily additionally provided in the brake circuit 2 serves to relieve the MUX operation. Accordingly, the MUX operation can be expanded by a pressure reduction in at least one wheel brake with outlet valve via time control. In particular, when this outlet valve is installed on the front axle this has the advantage that a simultaneous pressure reduction can take place immediately on both wheel circuits as a matter of priority. If a simultaneous pressure reduction is not required, the pressure reduction is carried out via the MUX control. This has in particular in extreme situations the advantage that the plunger can be operated with low reversing dynamics and thus the loading of the motor (high torque/inertial mass ratio) is reduced and cost savings are possible with the motor, since the motor has to be designed for low torque. In addition the new pressure control method has the extended degree of freedom of the simultaneous pressure build-up and pressure reduction.

As an alternative to only one outlet valve, an outlet valve can be provided on each wheel brake (outlet valves AV1, AV2, AV4 indicated by broken line), i.e. the system is equipped as a conventional ABS with intake valves (SV1-SV4) and outlet valves (AV1-AV4). With this configuration the pressure reduction in regular operation (e.g. ABS) can be performed by timing control of the outlet valves, and a conventional ABS control strategy can be used. This is suitable especially in the introduction of new systems, because the conventional control strategy can be used and software development costs can therefore be saved in the market introduction phase. In the braking force booster operation the pressure is controlled by path control of the piston according to the pressure volume characteristic both in pressure build-up and in pressure reduction. Also, a combination of the control can be used, e.g. pressure reduction control in the MUX operation with respectively open switching valves SV1, SV2, SV3 and SV4 and pressure reduction control via time control of the outlet valves AV1, AV2, AV3, AV4. The system is thus modular and can be expanded in development stages.

The pressure supply unit DE has an electric motor M and plunger 8 driven by a spindle 7, which moves left and right and has a pressure chamber 9. As an alternative to the spindle the plunger can also be driven via a nut/spindle, in which the spindle is connected to the plunger 8. The plunger pressure chamber is connected to the reservoir 6 via a non-return valve 10. In addition, the motor is equipped with a rotation angle transducer 12a, a sensor for measuring the motor phase current 12b, and a temperature sensor 12c. The temperature sensor 12c measures the motor temperature and thus increases the accuracy of the torque estimation, since the torque constant kt=torque/phase current changes proportionally to the temperature.

The pedal interface has redundant path sensors 11. The path sensors pick up the pedal request of the driver and are designed redundant for safety reasons. A pressure transducer 13 detects the pressure in the brake circuit II and, if the isolating valve TV2 is open, also in the brake circuit BK I. The pressure transducer is primarily used for the pressure control, but can also be used as an alternative to the force-path sensor (2 pedal travel sensors 11 via elastic member 11a) to recognise the driver's request. The function of the path simulator is described in FIG. 4a.

The pressure build-up and pressure reduction takes place via path control of the plunger 8 according to the known MUX method, wherein one or more switching valves SV are opened for the pressure change and the pressure change taking place at the same time or simultaneously or partly simultaneously via the pressure volume control. In the embodiment with only one outlet valve AV3 in RB3, the pressure reduction (Pab) can also take place simultaneously by time control of one or more switching valves SV1, SV2 and SV4 at corresponding differential pressure of wheel brake RB1 RB2, RB4 relative to the pressure of the pressure supply unit DE, measured with the pressure transducer 13. The pressure reduction of RB3 can optionally take place via AV3. In this example RB1, RB2 or RB4 can also be volume-controlled via MUX. The plunger must take into account the corresponding volume in the path control, both in the case of time control and volume control. The adjustment of the plunger is performed mainly on the basis of the pressure change specified by the controller and a path control based on the pressure volume characteristic.

In the pressure control in the MUX operation, both pressure chambers DR1 and DR2 are charged with pressure. The SK piston does not move and is forced against a stop 3 by means of a restoring spring. The spring ensures that the pressure piston is pressed firmly against the stop even in the case of pressure differences (pressure oscillations, rapid pressure reduction in the brake circuit BK I compared to BK II due to a lack of throttling effect of the isolating valve) and is accordingly dimensioned.

A throttle with non-return valve 5 is installed in the line SLL to the reservoir 6. The throttle does not have a small flow rate of at most 1% of the conveyed amount of the pressure generating unit as a loss volume, since in the normal situation the SLL is open. The throttle is necessary for the volume compensation during temperature changes. The SLL is closed in the fall-back situation. The non-return valve serves to bleed the brake circuit. In addition, a valve VD is provided in the auxiliary piston, which connects the pressure chamber DR3 to the reservoir. The valve VD is primarily used for diagnostic purposes, in particular leakage tests, and is described in more detail in FIG. 4.

In the fall-back situation (system failure), for example motor failure, the volume of the auxiliary piston circuit is fed into the pressure chamber DR2 via the feed valve ESV. This leads to pressure build-up in both brake circuits (BK II directly, BK I indirectly via floating piston). In addition, the plunger 2 also acts mechanically on the pressure piston after a certain free travel, which acts only in the event of failure of BK II. In addition, the pressure supply unit is disconnected from the main brake cylinder. This is performed by closing the isolating valve and overrunning the SK piston during pedal actuation of the seal and thus isolating the pressure supply unit from the brake circuit I.

The floating piston SK is not moving in the normal brake and ABS function. A diagnosis of the seal with movement of the piston is therefore also important. In this connection at each parking stop (so-called PSC) with the vehicle stationary, the pressure in the brake circuit BK II can be stored by closing the valves SV3 and SV4. From the brake circuit BK I the pressure is reduced to 0-1 bar via the pressure supply unit DE. The pressure supply unit DE is then blocked, i.e. no piston movement takes place, TV2 closes. The valves SV3 and SV4 then open, whereby the pressure acts on the rear side of the piston SK, which accordingly moves in order to build up the pressure in the brake circuit BKI, which is then in equilibrium with the pressure in the brake circuit BKII.

Advantageously the pressure introduction is only via SV1, and therefore the wheel pressure becomes higher. This pressure equilibrium is maintained for a period of time in which the tightness is measured via the pressure transducer. The advantage of this Park-Stop-Check method (PSC) is that there is no additional stress on the pressure generating unit for the pressure build-up and an autonomous hermetic test, but only in the low pressure range, which as is known for seals is more relevant than higher pressure. This can be used with appropriate loading of the DE, which is recommended for the vehicle service.

It has been mentioned that the initial pressure level of the MUX for the pressure volume control is in the range of the pressure level of the wheel to be controlled subsequently. This means that with an uneven road surface the pressure level fluctuates by up to 130 bar. Accordingly, the valves must be suitably switched.

Alternatively, the tightness test of the floating piston with the pressure generating unit DE can be carried out as follows:
a. a pressure is built up in the pressure chamber DR2 and DR1 via the pressure generating unit DE, and valves are switched in such a way that the pressure in DR2 is greater than in DR 1 and the floating piston moves and the connecting line SL to the pressure supply unit closes (e.g. when valves SV1 and SV2 are opened in the brake circuit I and valves SV3 and SV3 are closed in the brake circuit II)
b. a test path profile or a pressure volume profile over time is produced via the pressure generating unit.
c. by evaluating the pressure transducer, the variable pressure increase is evaluated compared to the desired target value profile with the valves SV1-SV4 open.

Instead of the ESV valve, which connects the pressure chambers DR2 and DR3 of the main brake cylinder HZE to one another, the valve circuit shown in the upper right-hand corner, consisting of the two valves ESV1 and ESV2, can also be used. ESV1 is connected via the inlet side of the valve seat and ESV2 is connected via the anchoring space to the hydraulic connecting line VL4. This valve circuit has the advantage that it produces only a small flow resistance between the two pressure chambers DR2 and DR3, and even with large pressure differences between the pressure chambers in the event of a fault, the connection between the pressure chambers is made by opening at least one of the valves ESV1 and ESV2.

Figure 1B:
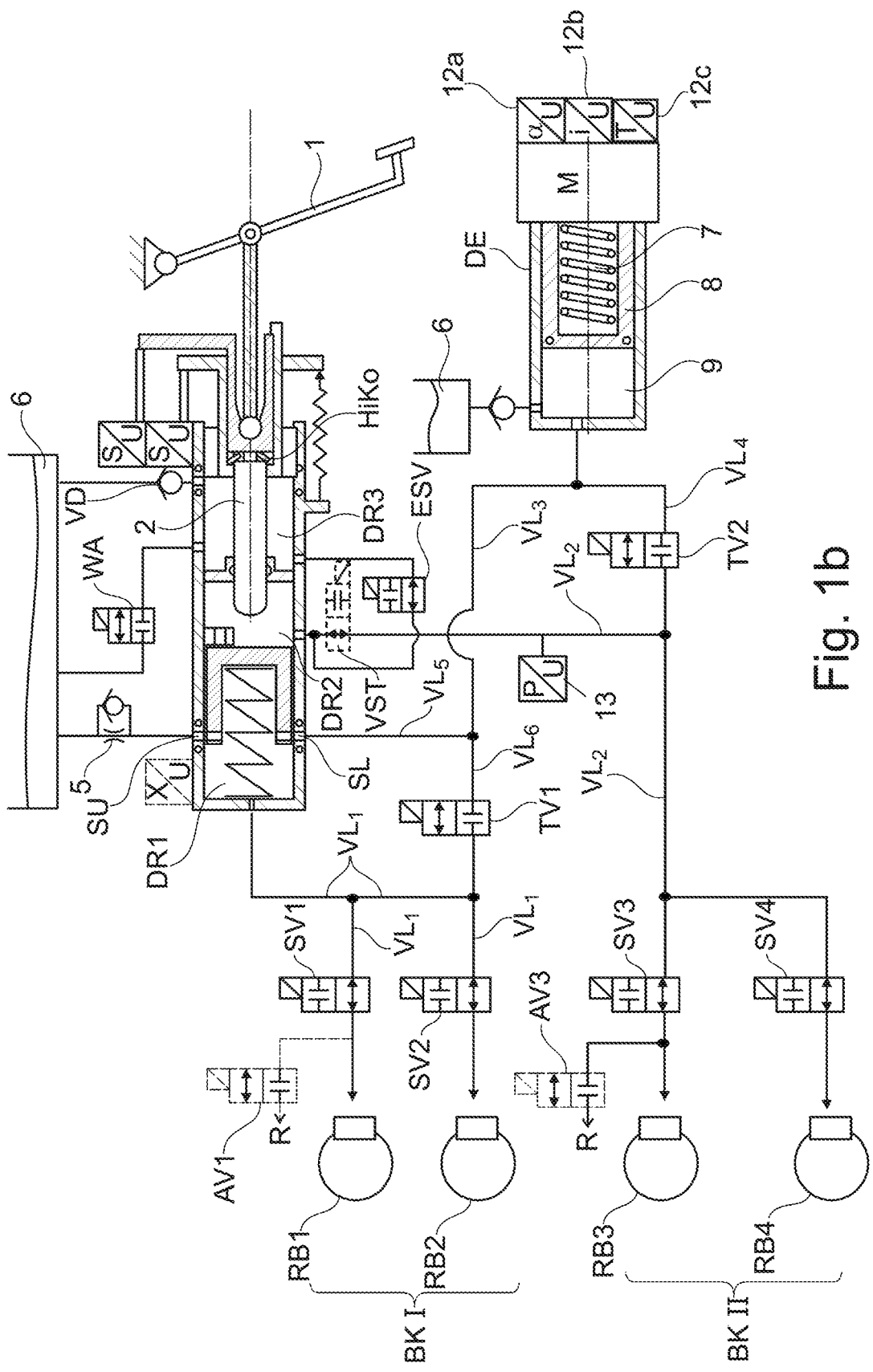

FIG. 1b shows a variant of FIG. 1a with a direct connection of the pressure supply source to the brake circuit and separation via a further isolating valve TV 1, which also acts as a diagnostic valve. This has the advantage that the floating piston does not move during operation or is secured during movement without the pressure supply source DE being disconnected from the brake circuit even if the sniffing hole is overridden by the floating piston, and it thus always ensured that a pressure build-up and pressure reduction can take place in the brake circuit I. In addition the movement of the piston can be appropriately diagnosed via a differential pressure determination in the brake circuit I and brake circuit II. For the differential pressure measurement the pressure transducer 13 and the pressure calculation in the brake circuit II are used by evaluating the phase currents of the motor of the pressure supply unit. Alternatively, or in addition to the pressure estimation, the position of the floating piston SK can be determined via a path sensor 14, which detects the position of the SK.

The disadvantage is the introduction of a further isolating valve. However, this does not increase the flow resistance when the pressure feed primarily continues into the pressure chamber DR1 or the pressure reduction takes place via the sniffing hole SL.

Figure 1C:
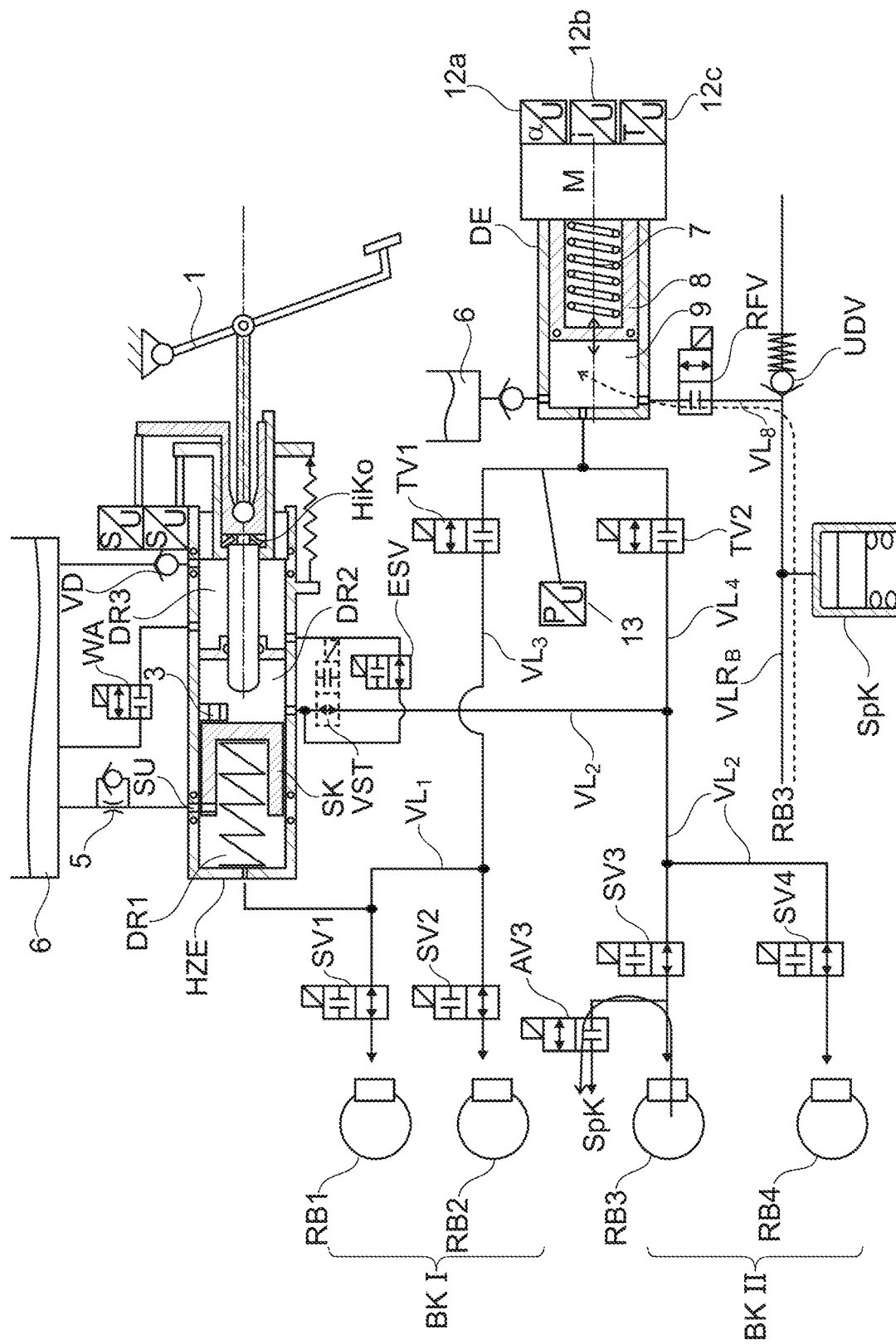

FIG. 1c shows an expansion of the brake system shown in FIG. 1a. In contrast to FIG. 1c, the pressure generating source is directly connected to the brake circuits via an isolating valve TV1 (no feed via sniffing hole). In this case a movement of the floating piston without any functional limitation is possible. Instead of a large isolating valve TV1, one isolating valve can also be used for each wheel brake RB1 and RB2. This is not shown in the drawing of FIG. 1c. This is useful where appropriate in the sense of reducing the flow resistances, and facilitates the multiplexing operation, in particular in the brake circuit I.

A further system expansion in FIG. 1c is the introduction of a low-pressure reservoir SpK and a recirculation valve (RFV), similar to ABS, in combination with a pressure-relief valve (UDV). If the reservoir is connected, as in this embodiment, to one or more outlet valves of the wheel brakes, this can contribute to the relief of the MUX, in that in critical situations (e.g. ABS high-p a wheel with high slip) the pressure is not reduced via the SV and the pressure generating unit but via the AV (here AV3). In contrast to FIG. 1a and FIG. 1b, the volume does not enter the recirculation but goes to the reservoir SpK. Apart from the closed BK, this has the advantage that with delivery NF of the piston of the DE, the pre-pressure is greater than the atmospheric pressure without SpK, the delivery time can be shortened and thus the interruption of the pressure build-up is shorter. In previous designs of delivery valves there was always the problem that extremely large valve cross-sections had to be provided for operation at low temperatures. This is now much easier due to the existing pre-pressure in the reservoir. The dimensioning of the RFV is therefore significantly simpler since no such large cross-sections have to be provided. The NF is performed by opening the RFV, closing TV1 and TV2 or alternatively all SV, and retracting the piston of the pressure generating unit.

A further application of SpK consists in designing the DE with a smaller stroke volume by utilising the volume for fading and rapid prefilling when braking from the Spk. If the fading region is recognised and the DE can no longer provide any further volume, then a delivery from the reservoir takes place in a short time. The basic idea is also that the reservoir is ideally filled by the pressure generating unit during vehicle start-up and thus always provides volume. If the reservoir is still full on ABS actuation and a pressure reduction is necessary via an AV, then the UDV is provided in this case, via which the volume van flow from the wheel brake cylinders via the AV and the UDV into the reservoir. After the delivery the DE has more volume, so that with Pab a pressure compensation takes place. This is possible in that the DE piston, as in the case of the conventional THZ, travels over a sniffing hole SL (not shown in the drawing) to the end position and thus leads the excess volume into the reservoir 6.

In principle this combination SpK, RFV and UDV with associated AV can also be combined with the solutions in FIGS. 1*a* and 1*b*. as well as with all other plunger solutions that run in the MUX operation. It is envisaged here to relieve the MUX especially in high-p situations via the circuit but to drive in pure MUX operation at low-p.

Figure 2A:
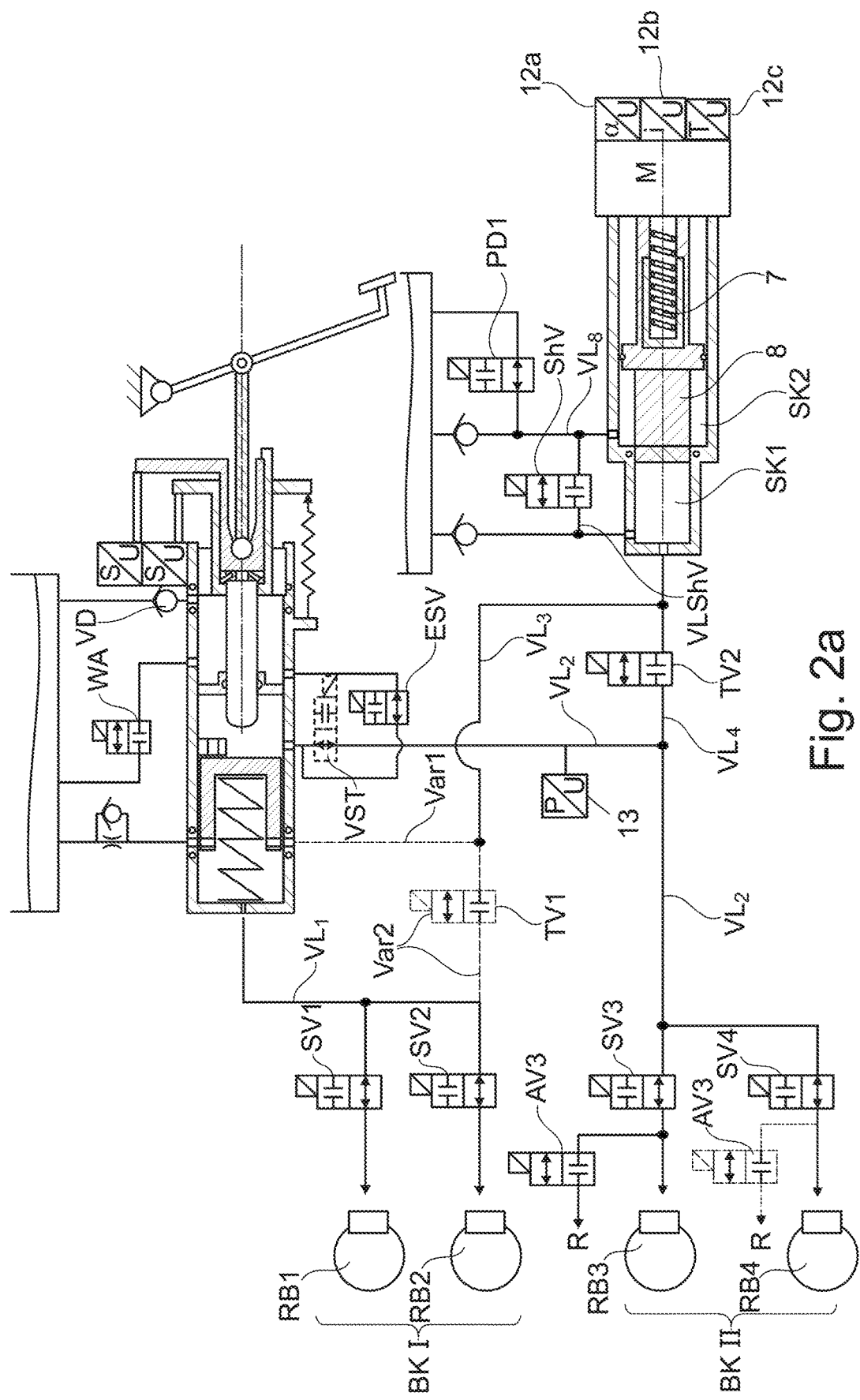

FIG. 2*a* shows a variant of the system according to the invention with a differential piston as pressure generating unit. The differential piston pressure generating unit consists of a plunger, which is driven by a ball screw drive and consists of two chambers SKI and SK2. The connection to the brake circuits is identical to FIGS. 1*a* to 1*b*. The arrangement is shown with an outlet valve AV3 in the brake circuit BK II, which can optionally be extended by a further outlet valve AV4. Also, the direct pressure supply with DR2 (variant Varl) or in addition the direct connection to the brake circuits is possible via an isolating valve TV1 (variant Var2). A direct connection of the BK I via the pressure supply unit DE to an isolating valve, as shown in FIG. 1 *c*, is also conceivable.

The pressure build-up is effected by forward displacement of the piston, which consists of two chambers SKI and SK2. A return movement of the plunger of the differential piston takes place when volume is discharged via outlet valves. Lost volume is thereby replenished. At low pressures, fast braking, the valve ShV is preferably opened and PD1 is closed and the volume of both pressure chambers is conveyed to the brake system. This achieves the desired prefilling effect. When operating at higher pressures ShV is closed and pressure is released into the reservoir via PD1. The smaller hydraulic surface then acts for the further pressure build-up and pressure reduction and the motor can be downsized since the torque requirement drops.

The pressure can also be reduced in a pressure-controlled manner by pressure measurement via the central pressure sensor via the valves ShV and PD1. This is suitable particularly at high pressures or after completion of the ABS control and is described in more detail in the embodiments of FIGS. 3*a*-3*c*.

Figure 2B:
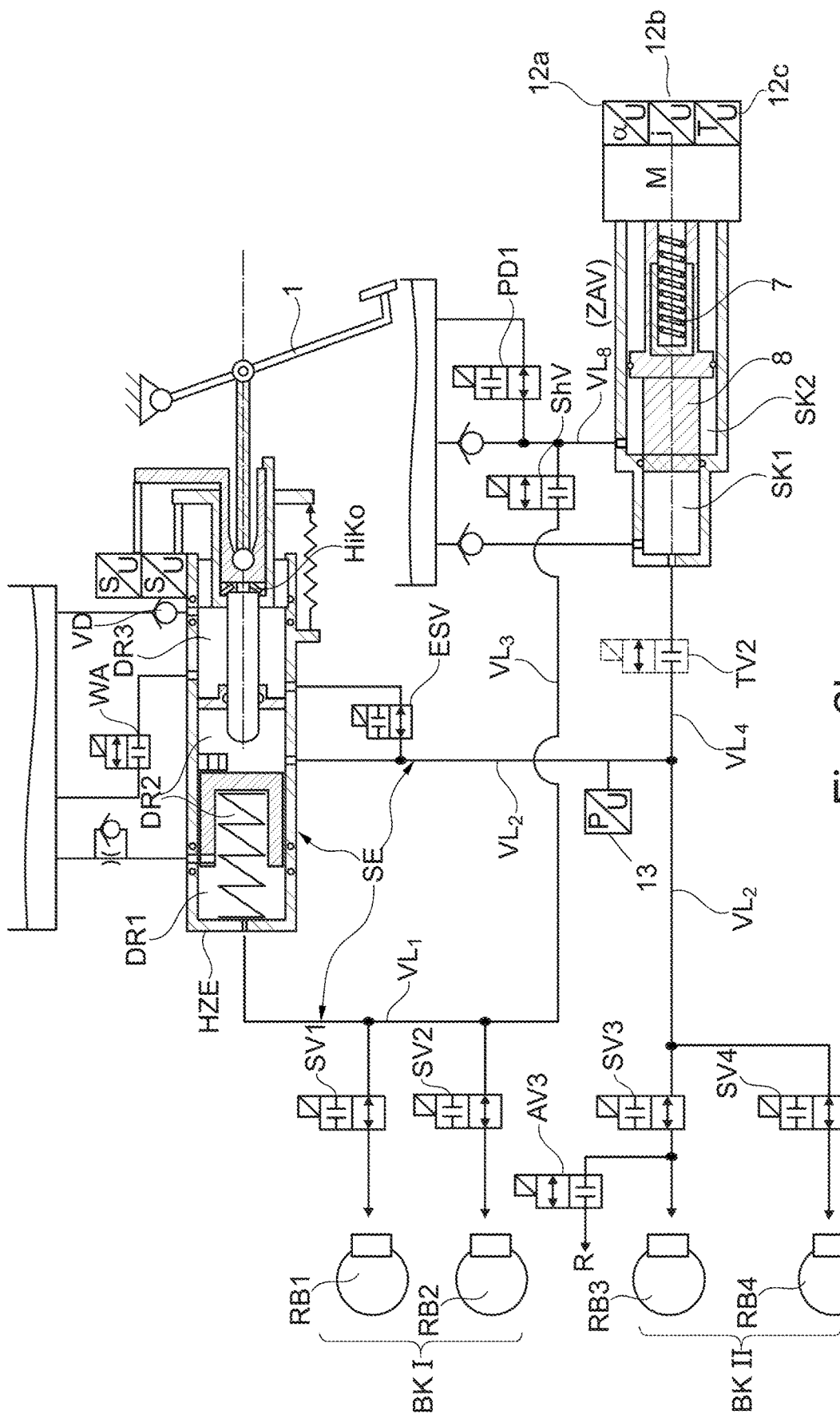

FIG. 2*b* shows an alternative of the system according to the invention with a differential piston as pressure generating unit. In contrast to FIG. 2*a*, SKI is connected via an isolating valve ShV to brake circuit I and SK2 is connected directly or via an isolating valve TV2 to brake circuit II and pressure chamber DR2. The use of both chambers is employed especially in normal BKV operation, ABS (up to 120 bar). The pressure can be conveyed with low flow resistance directly into the brake circuits. This allows a very fast braking. In brake circuit BK II an outlet valve AV3 is provided in addition for the discharge control. Optionally the PDI valve can also be used as an outlet valve by pressure release control when the ShV valves are open, with which at the same time the brake circuit II can be operated in multiplex operation and pressure in the brake circuit BK I is reduced by opening the switching valve SV1 and/or SV2, ShV and PD1. Certain cases of failure (e.g. failure of BK I) can have an effect on BK II. In this case the floating piston is displaced on confirmation of BK II and also leads to a failure of BK II. In order to prevent this a blocking element SE is provided, which either blocks the supply of the DE into the pressure chamber DR2, blocks the floating piston, or blocks the connection between DR1 and BK1.

Figure 3A:
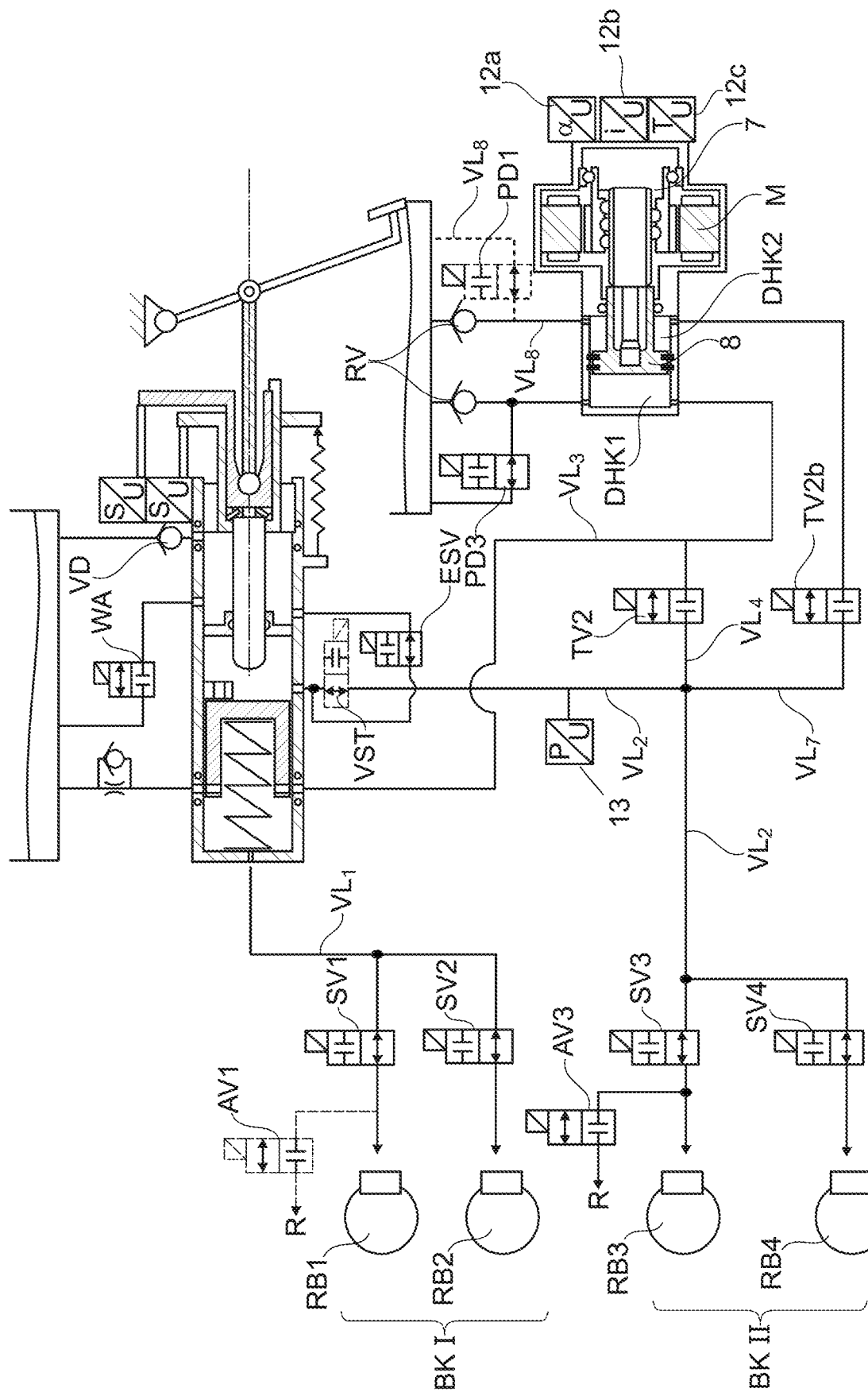

FIG. 3*a* shows the embodiment of the system according to the invention with a double stroke piston as pressure generating unit in a single-circuit design. The pressure generating unit consists of an electric motor M, a ball screw drive 7, which drives a piston 8 that acts on two pressure chambers DHK1 and DHK2. Preferably via a pressure relief valve PD3 or alternatively or optionally via a supplementary PDI valve, one or both pressure chambers of the double stroke piston DHK1 (DHK2) is connected to the reservoir 6. Both pressure chambers are also connected by non-return valves RV to the reservoir 6. The front pressure chamber DHK1 is connected via the sniffing hole to DKI and the wheel cylinders RB1 and RB2, and also via an isolating valve TV2 to RB3 and RB4. The rear pressure chamber DHK2 is connected via a further isolating valve TV2*b* to DR2 and RB3 and RB4. Switching valves SV1 to SV4 are connected respectively upstream of the wheel brakes. The pressure transducer is arranged in the brake circuit II. The brake circuit BK II has an outlet valve AV3 between the wheel brake and switching valve, which is optionally supplemented by a further outlet valve AVI in the brake circuit I. The brake system is primarily operated in the multiplex mode, wherein additional outlet valves AV3 (AVI) are provided in the wheel brakes for pressure reduction via time control. The pressure build-up/pressure reduction takes place over the forward stroke/return stroke of the double stroke piston and opening of the switching valves SV1 to SV4 as well as TV2/TV2*b* and pressure control via piston travel and piston speed. The pressure can also be reduced via one or both chambers of the double stroke piston (DHK1, DH2) by time control of the switching valves SV3, SV4 and PD1 or SV1, SV2 and PD3. For the pressure reduction, in particular in the brake circuit II, the pressure reduction can also be effected in a pressure controlled manner by pressure measurement via the central pressure sensor 13.

If the volume of the forward stroke is expended in the pressure build-up, a further pressure build-up takes place in the return stroke of the DHK. This means that PDI is not used or is closed. In this case the volume is fed via TV2*b* into DR II and BK II and is transferred via the floating piston to the BK I. The pressure build-up takes place very precisely from the forward stroke and return stroke operation of the double stroke piston via pressure volume control. For the rare case of operation at high pressures, the pressure is primarily built up in the return stroke.

There are various possibilities as described above for the pressure reduction from the high pressure range. Thus, by a corresponding valve actuation the volume can be reduced from the high pressure range via an outlet valve PD3 (PDI) at the double stroke piston, while at the same time the double stroke piston is displaced in a position-controlled manner. For the pressure reduction the PD3 valve is preferable to the valve PD, and from a cost perspective only the PD3 valve is justifiably used.

The pressure reduction at high pressures (>100 bar) takes place in a system with exclusively PD3 valves, preferably in the following process steps:

a. pressure reduction from high pressures in the first phase via pressure control and pressure measurement via PD3 valve and the corresponding valve opening of the valves (SV1-SV4, TV1, TV2, TV2*b*) to the wheel brake (e.g. 180 bar to ca. 80-100 bar)

b. method of the double stroke piston in forward stroke operation with simultaneous opening of the valve/valves that connect DHK1 and DHK2 (TV2 and TV2*b*, ShV)

c. further pressure reduction of the double stroke piston in the return stroke operation via pressure volume control with pressure measurement via pressure transducer d. positioning in the initial position of the double stroke piston (e.g. Initial position for atmospheric pressure), volume delivery via non-return valves.

As an alternative to the PD3 valve the pressure can be reduced via the PDI valve and a correspondingly adapted method. In the pressure reduction via PD1 the valves that are required for connection to the wheel brakes (SV1-SV4, TV2b) are opened in the brake circuit II, and the pressure is reduced via pressure control and pressure measurement. The pressure reduction in the brake circuit BK I can be effected by opening the valve TV2 or pressure can be reduced via the return stroke of the double stroke piston 8. Since in the pressure chamber DHK2 an almost pressure prevails, which is close to atmospheric pressure, the pressure in BK I can be reduced by volume control or path control of the double stroke piston.

If instead the pressure is reduced via an outlet valve, this has the disadvantage that the brake circuit has to be opened and one outlet valve per brake circuit must be used on account of pressure compensation. The PD1 is not located in the brake circuit, and a possible failure due to leakage is prevented by the isolating valve TV2b.

The possible valve circuits with DHK allow additional levels for the ABS and MUX operation:

i. pressure build-up in one brake circuit and pressure reduction in the other brake circuit
ii. independent pressure reduction regulated by pressure transducer/pressure calculation in both brake circuits via the pressure supply unit and connection of the double stroke piston via PD3 (PD1) to the reservoir The method described above for the pressure reduction control at high pressures as well as the additional possibilities (i), (ii) also apply to the subsequently described embodiments of FIGS. 3b and 3c.

With these degrees of freedom the novel pressure control offers many more possibilities than the pure MUX control.

Figure 3B:
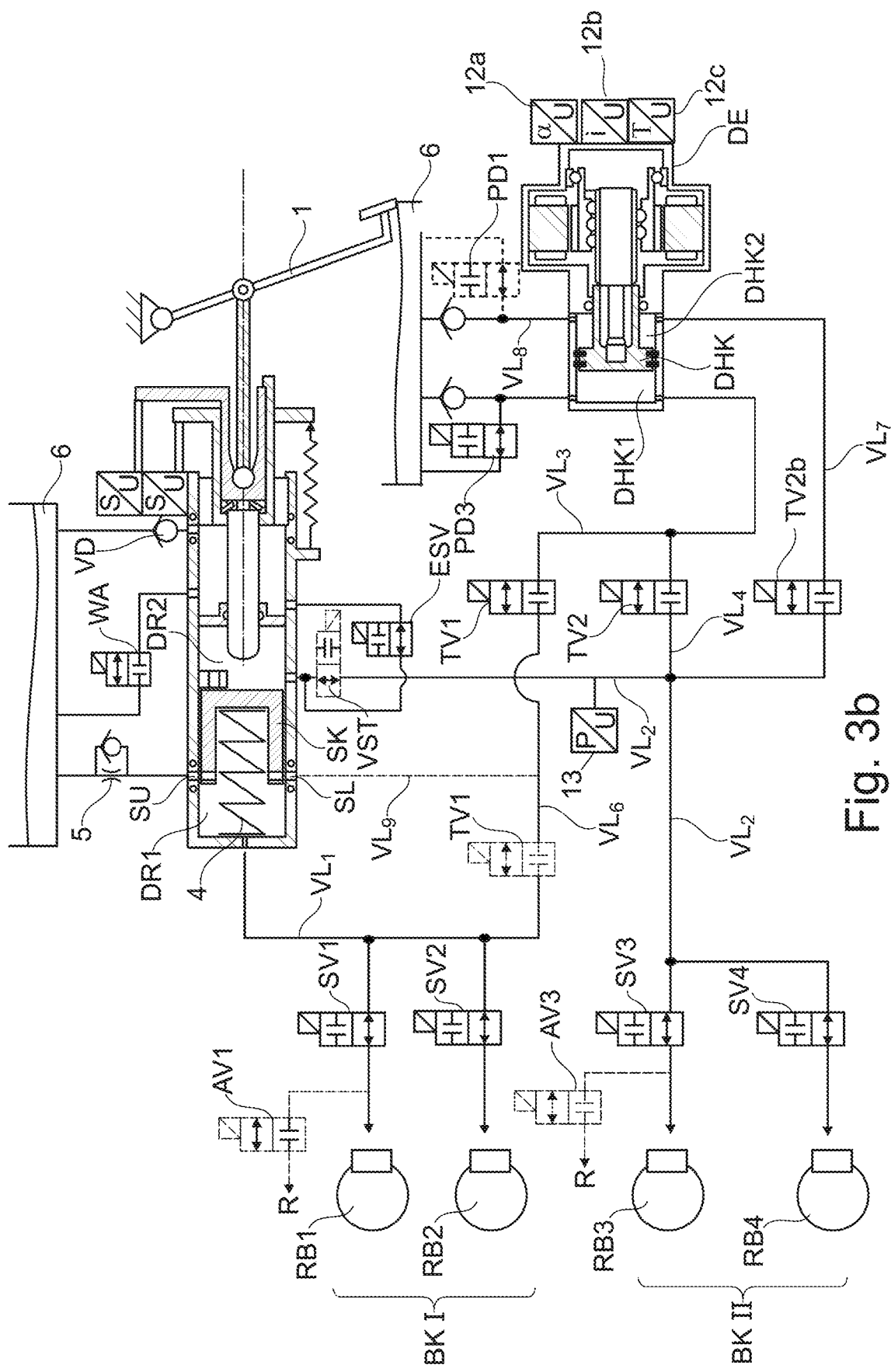

The embodiment shown in FIG. 3b is comparable in function, the only difference being that an isolating valve TV1 is connected between BK I and the pressure supply unit and the isolation is not necessarily effected by covering the sniffing hole with the floating piston. In this connection 2 variants are conceivable as an alternative. In a first variant the isolating valve TV1 is positioned directly at the outlet of the pressure supply unit, and the pressure supply unit is connected directly to switching valves SV1 and SV2. In a second variant a supply line VL9 is provided, so that a pressure change via the sniffing hole SL is possible, analogously to FIG. 1b. In this case the isolating valve TV1 is displaced and is positioned after the supply line VL9 between the pressure supply unit and switching valves SV1 and SV2. This additional effort allows a movement of the floating piston, e.g. by different pressures in BK I and BK II and thus gives the system more degrees of freedom, e.g. the pressure in the DRI does not necessarily have to be higher than or equal to that in the DR II, or the movement of the floating piston can be permitted by a movement of the path simulator plunger. This embodiment allows more degrees of freedom in the execution of the path simulators. The pressure control takes place similarly to FIG. 3a.

Optionally the TV1 can be completely dispensed with if the PD3 (PD1) valve is replaced by a normally closed SG valve. The isolating valve PD3 (PD1) can block the double stroke piston unit in movement, so that in the event of a failure no further volume can be accommodated in the pressure supply unit by movement of the main brake cylinder. In this system arrangement it is also practicable to use only one PD3 valve, similarly to FIG. 2a.

The valve circuit of FIG. 3b also allows a movement of the SK piston during normal pressure build-up if, in the forward stroke of the double stroke piston, the volume reaches via TV2 the line VL4 in the brake circuit II and the TV1 is closed at the same time. The SK piston then moves if necessary to the left stop. In the further pressure build-up via the return stroke the volume is conveyed via the valves TV2b, TV2 and TV1 to the line VL1 of the brake circuit. At the same time the same pressure acts as in the pressure chamber DR2 via the valve VL2 as in the pressure chamber DR1. On account of the sealing friction the floating piston remains in this position despite the return spring. In the pressure reduction from the high pressure range the floating piston SK remains in this position, while volume is led via the valve PD1 or the valve PD3 into the reservoir 6 until the pressure has reached ca. 100 bar. On further pressure reduction the double stroke piston 8 is preferably in the end position of the forward stroke. Then the pressure in the pressure chamber DR2 can first of all be reduced by opening TV2 with TV1 closed. The pressure in the wheel brakes of the BK II is reduced, and at the same time the floating piston SK moves back to the initial position. The floating piston SK is thus charged via the seals with the brake pressure. A leak is immediately detected via the volume balance by evaluation of the p-V characteristic, if for example the volume delivery of the DHK is greater than the target value from volume and corresponding pressure from the p-V characteristic. In simple words, it is recognised when volume is conveyed at constant pressure without ABS operation.

For some operational cases, e.g. ABS, the SK piston can also be actively moved back to the initial position. This is performed by a corresponding adjustment of a pressure difference in the pressure chambers DR1 and DR2 by means of specific valve switching TV1 and TV2 and piston control. In the ABS operation the pressure in the pressure chambers DR1 and DR2 is substantially the same, and therefore the floating piston SK does not move. When operating with unequal pressures it should therefore be ensured that the pressure in the pressure chamber DR2 is less than in the pressure chamber DR1. The floating piston SK is thereby in a defined position also in the event of system failure with ABS. This is particularly interesting for the control of the fall-back situation.

The valve functions of PD1 and PD3 have been described for the pressure reduction control. These can be replaced if, for example, at least one outlet valve AV is used in the pressure reduction. In this case each chamber of the double stroke piston is connected to the reservoir only via non-return valve(s). The volume of the second pressure chamber of the double stroke piston DHK2 then counteracts the volume of the wheel brakes RB1-RB4 during the pressure reduction via TV2b, but has the same effect as a pressure reduction via PD1. The pressure reduction control can also take place via the pressure transducer.

The safety risk due to the opening of the brake circuit via an outlet valve and leakage during closing can for example by assessed by diagnosis towards the end of braking, in that a low pressure, e.g. 10 bar, for the front axle with AV remains constant over a short period of time (e.g. 100 ms). The leakage is detected by the pressure change with immovable double piston. A hidden fault can thereby be excluded.

Figure 3C:
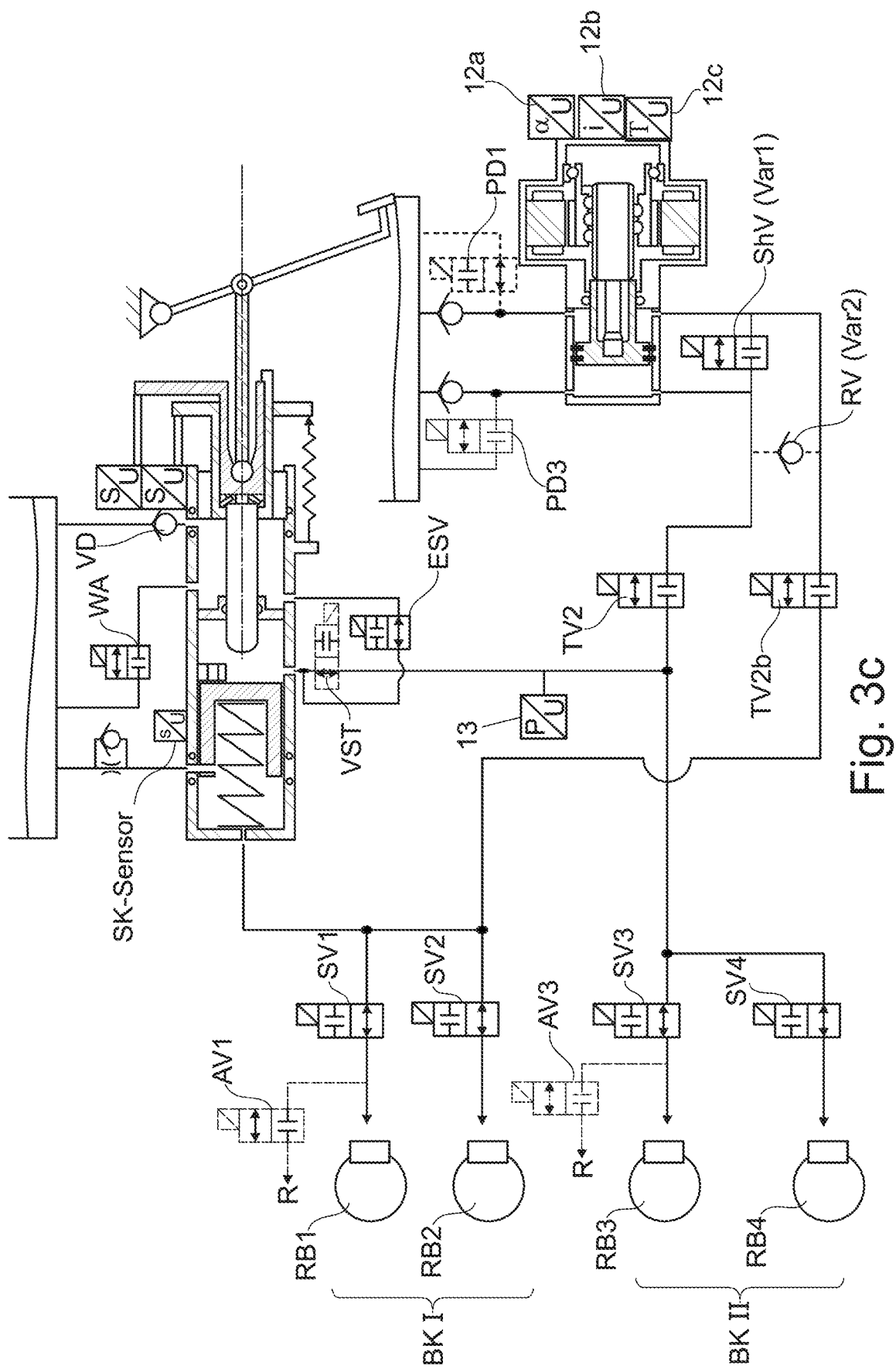

FIG. 3c describes a system with double stroke pistons in an application for autonomous driving with an advantageous two-circuit design. The construction of HZE, DE and the valve circuit for pressure control of ABS with MUX and outlet valves is identical to FIG. 3a and FIG. 3b.

In contrast to FIGS. 3a and 3b, the pressure supply in the forward stroke acts on the brake circuit BK II and the rear side of the floating piston SK. This transfers the volume and the pressure to the brake circuit BK1. If the double stroke piston is near the end position, it is reversed and operated in the return stroke and acts on BK1. Then pressure acts on the front of the SK via the return stroke. This transmits the pressure to the brake circuit BK2. The SK piston is always in active movement like the present-day HZE with its seals.

The double stroke piston additionally has a bypass valve ShV, which is switched essentially under three conditions:
a) at high pressure, in order to reduce the piston force the volume of the forward stroke is also fed to the rear of the double stroke piston for the pressure equalisation
b) in ABS control, also MUX control, the double stroke piston is switched to single-circuit operation
c) pressure reduction Pab from a high pressure level A non-return valve RV can be used instead of the ShV to reduce the magnetic valve expenditure. In this way the volume flow of the forward stroke can be diverted via RV to the secondary side of the SK when TV1 is closed. In this way its position can be regulated with an additional sensor that measures the position of the SK. This is advantageous in that the SK position is obtained depending on the position of the HiKo. This is advantageous for the fall-back situation, since in the event of failure of the DE of HiKo the volume reaches the SK. With an unfavourable position of the SK the HiKo can move the SK early to the left to the stop with a corresponding volume. This has the result that pressure is still only built up in the BK II and asymmetric pressures occur in BK I and BK II.

The pressure reduction takes place as in FIGS. 3a, 3b. At least one PD valve (PD1, PD3), preferably only one PD3 valve, is therefore used for the pressure reduction via the double stroke piston. The pressure reduction process is carried out analogously to the description in FIG. 3a.

For special functions in the pressure build-up pauf in BK I and pressure reduction pab in BK II, and vice versa, it is advantageous to insert an additional locking element SE (e.g. magnetic valve (MV) in the BK II in the connection to the THZ, which prevents the movement of the floating piston SK. The stop valve SE can also be a component of the HVZ.

This system also includes the additional potential to relieve the pressure in BK II via the DHK piston 3 and separately from BK I via the valves TV2 (TV2b) and PD3 (PD1).

This solution has advantages when used for different pressure level control on both axles during recovery. For this purpose the locking element SE must then be used on the SK or in the BK I.

FIGS. 4a and 4b describe the construction and the mode of operation/control of a plunger path simulator with pressure-proportional feedback to the brake pedal.

In the braking force booster operation the brake pressure acts on the pedal plunger and generates a pressure-proportional force on the brake pedal. In this case the auxiliary piston in the path simulator unit is unpressurised and the volume is conveyed to the reservoir via a WA valve. The ESV valve is closed. In ABS operation the pedal characteristic can be altered by opening the ESV valve and the pedal can be stiffened by closing the WA valve. A different pedal travel-force characteristic can be adjusted in this way. In addition a pulsing response to the pedal, similar to the current ABS, is possible by timing the WA valve. The special VD valve is employed in the connecting line to the reservoir and can be used to diagnose the tightness of the WA valve and HiKo. For this purpose pressure fluid can be introduced from the pressure supply DE into the HIKO via the open ESV. The VD valve is designed as a flow valve and closes if there is a higher flow rate into the reservoir. In normal operation VD functions as a suction valve for filling the HiKo space. A disadvantage of the plunger simulator occurs if the individual axles require different brake pressure levels, and the driven axle requires less braking pressure as a result of the braking action of the generator. This is referred to as fading out of the corresponding brake pressure for the wheel brakes.

In FIG. 4b a control possibility is shown, with which only a lower pedal reaction is achieved at different brake pressures. In the brake pressure introduction p1-axle 1 (driven by the generator, e.g. RB1 and RB2) is moved to the p2 axle (not driven, e.g. RB3 and RB4) and regulated. In this connection, in the recovery with so-called blending at a specific differential pressure the pressure is controlled stepwise. In this case the WA valve closes briefly with a corresponding response on the pedal, which allows an additional pedal movement due to the elastic member of the KWS (E123a). The WA valve then re-opens. The target pressure can change in P2. It is important that the pressure stages are small and the closing duration of the WA is small.

Alternatively, the WA valve can also be open, in which with a stepwise pressure build-up in the p1 axle the pressure in the p2 axle (wheel brakes in the brake circuit II) is quickly corrected. In this way the pedal reaction, which is proportional to the pressure in the brake circuit II, is less strongly influenced by different pressures in the wheel brakes of the brake circuit. In addition, the pressure control method according to FIG. 6c can be used, in which the pressure build-up phase is correspondingly regulated by means of the DE of the p2 axle. This is easily possible if WA is open.

Figures 5A, 5B:
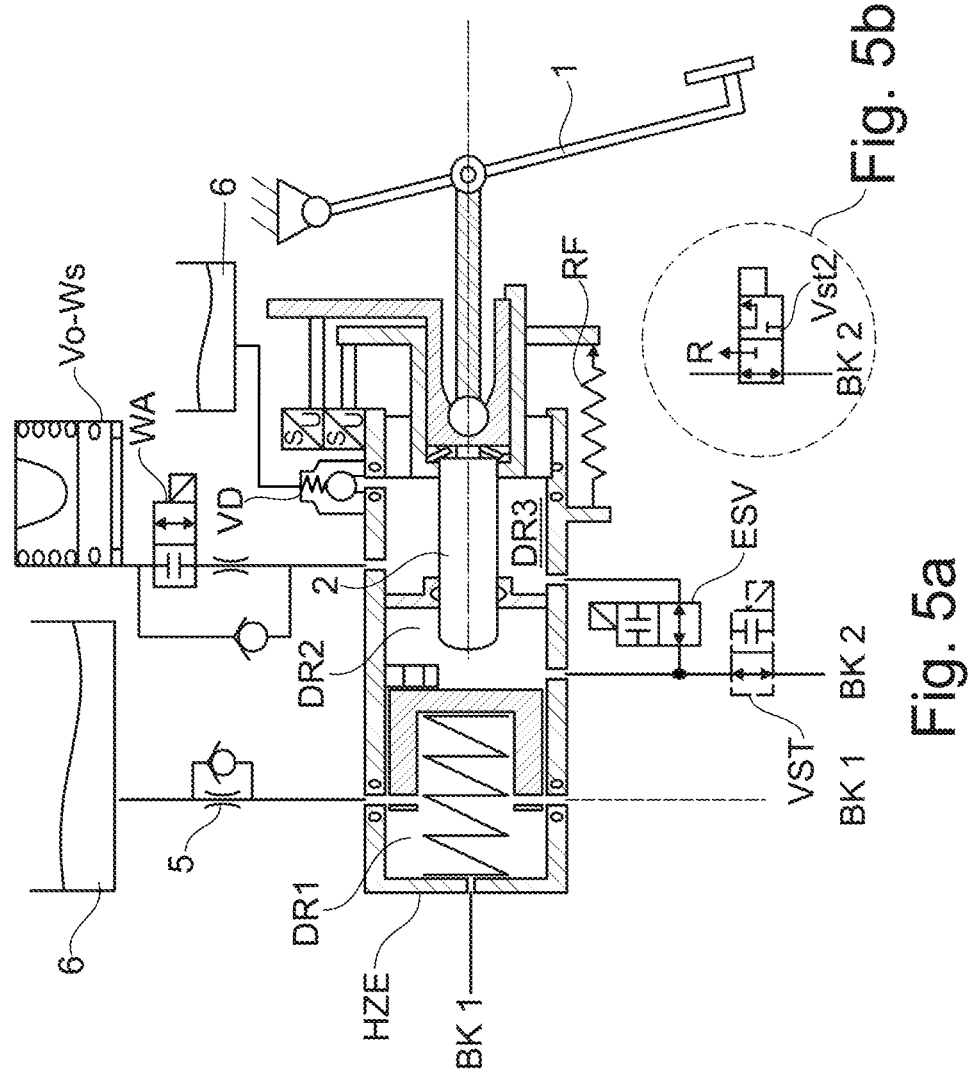

FIG. 5a and FIG. 5b show a path simulator with auxiliary pistons based on WO 2012/034661. Here a plunger is used, the dimensioning and switching of which can be selected for different pedal reactions.

With pedal reaction the additional valve VST and alternatively VST2 remain open or are omitted, if this is required. The variable pressure in BK2 in the case of ABS operation also acts on the plunger and the pedal force as an overlapping with the pressure force of the path simulator piston. If the WS piston is controlled, the pedal acts hard without additional movement: here the force-path sensor KWS is controlled.

The piston plunger can in addition be designed with a pedal restoring spring so that it provides the first flat part of the path simulator characteristic, and the more progressive increase in force is provided by the piston path simulator. In this way the path simulator becomes considerably smaller. In this operating state the Vst is open.

If this reaction of ABS or recovery is not desired, then a valve Vst can be used which does not allow the control pressure of the pressure generating unit in DE 2. With Vst2 as an alternative, additionally the DR2 is unpressurised by connection to the return to the reservoir.

If now no ABS reaction to the pedal is desired, the VST is closed and the ESV is opened. A pressure equalisation thus takes place between DR 2 and HiKo, so that the plunger does not experience any reaction force. When the WS piston is controlled the pedal becomes stiff.

Alternatively, the VST2 can be used as a 3/2-way valve. In the switched state the pressure chamber 2 is connected to the return, so that no pedal reaction occurs. The ESV is open in the fall-back situation in the event of a motor failure, so that the HiKo acts on the SK as in the case of a THC.

Figure 5C:
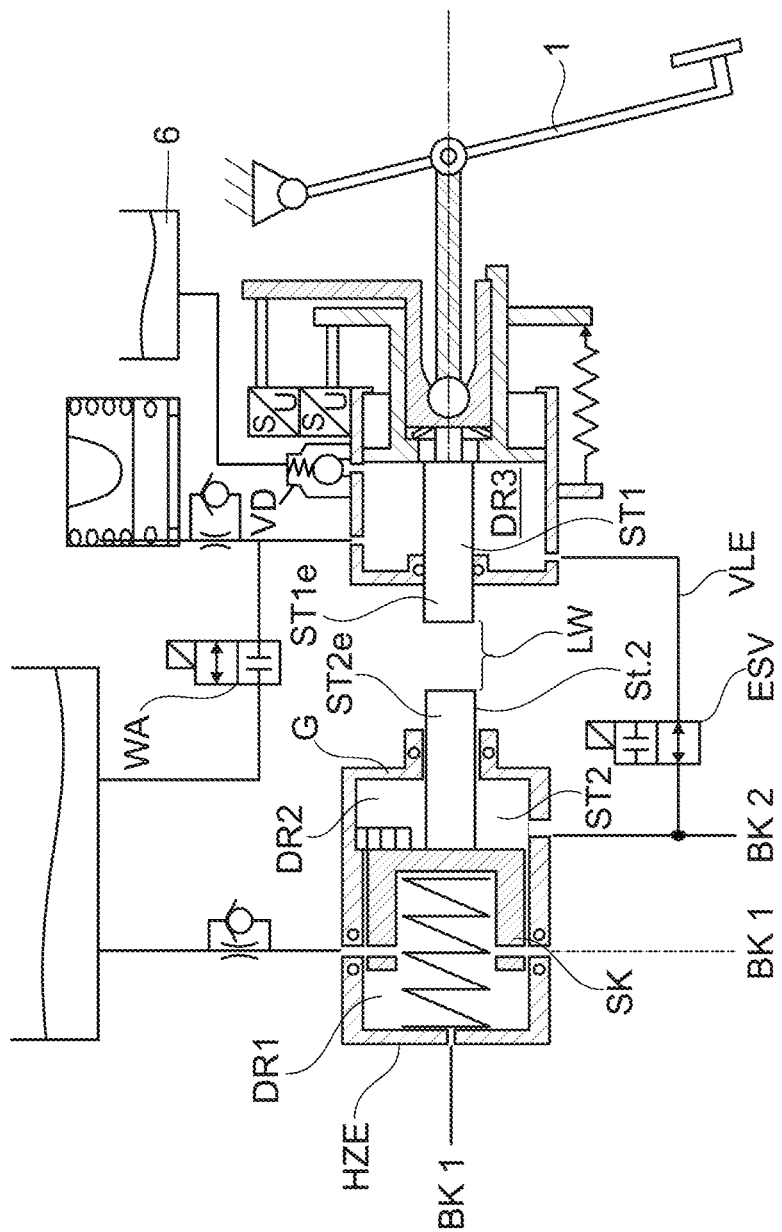

In FIG. 5c the SK piston is connected with DR 2 to the outside via a second plunger St 2. The HiKo acts with the plunger without counter-pressure, so that in this case there is no reaction of the brake pressure in BK2. In the fall-back situation the ESV is subjected to the same action as in FIG. 4a. In the event of HiKo failure, the HiKo plunger acts on the SK plunger St2 after the idle movement LW The described path simulator concepts meet all the requirements of pedal characteristics. FIG. 4a is the variant with the lowest costs and high fail safety and diagnostic reliability, a natural desired pedal reaction in the brake force booster mode (force-proportional boost) and moderate pedal reaction in the ABS mode, but a more complicated control for freedom from reaction in the recovery mode.

Variants 5a-5c are reaction-free solutions and are therefore suitable in particular for use in hybrid vehicles with strong recovery.

Figure 6A:
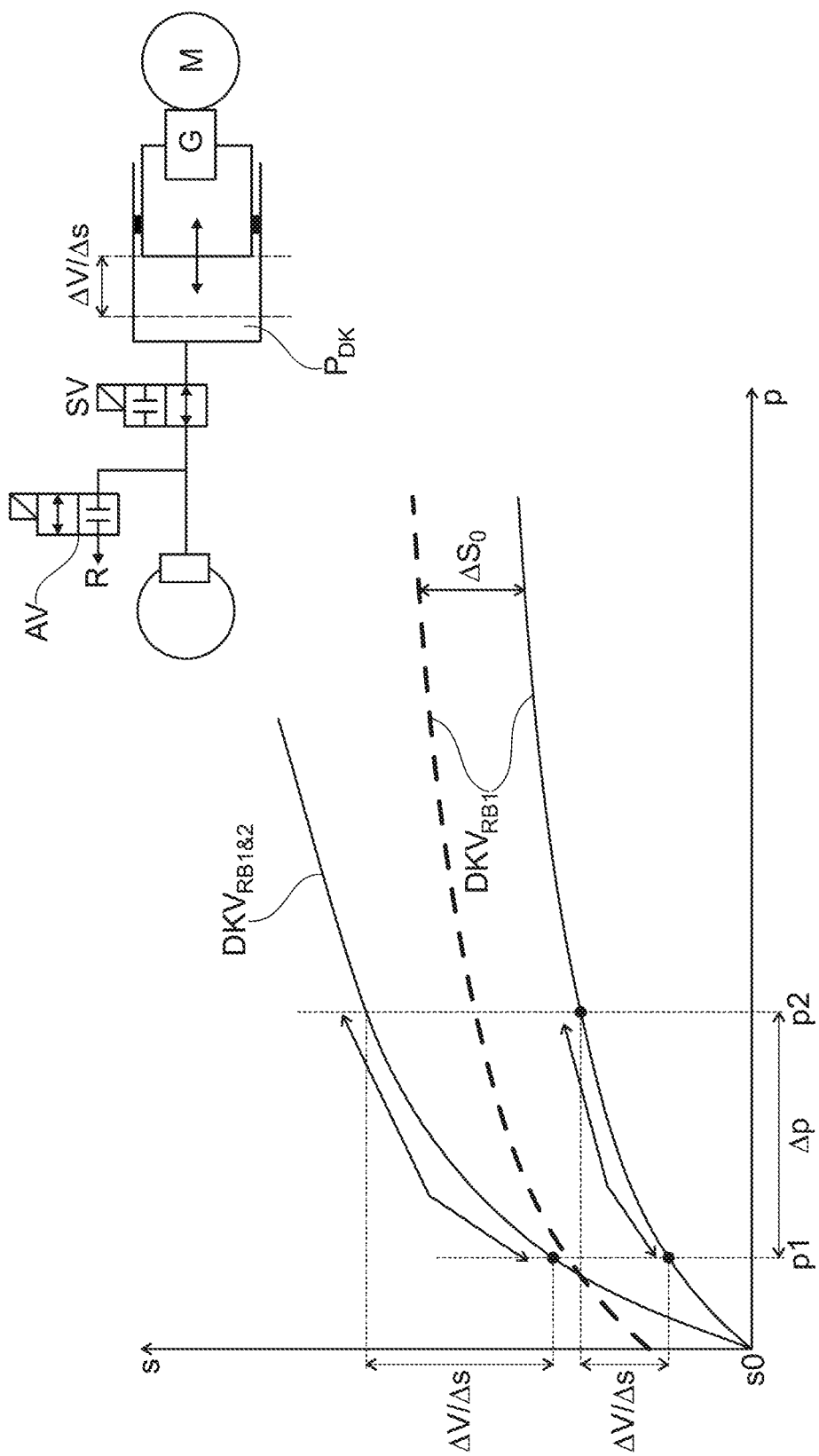

FIG. 6a describes the relevant pressure-volume characteristics, simplified for the pressure control without hysteresis, in the closed brake circuit and displacement after pressure reduction with open outlet valve AV. Starting from a pressure p1, the required volume displacement Δv or path change Δs of the piston is read from the characteristic curve via target setting of the differential pressure Δp. These differ and are dependent on whether the pressure is changed in one or more brake circuits. The piston is then displaced accordingly. If the pressure is reduced via one or more outlet valves, there is a volume loss in the pressure generating unit. For a further pressure reduction or pressure build-up in the closed brake circuit the path allocation of the pressure volume characteristic line is determined by recording the pressure. This is required in the regulation for the control of the volume conditions, since the working chamber of the pressure generating unit has only a limited volume, and therefore towards the end of the stroke movement of the piston it would travel to the stop in the event of a volume change command. If the piston of the pressure generating unit comes into the vicinity of the stop after a pressure change and a further increase in pressure is pending, the piston of the pressure generating unit (single-stroke piston, differential piston) is briefly retracted with the switching valves SV closed, in order to draw volume from the reservoir. In the implementation of the pressure generating unit with double stroke piston (FIGS. 3a, 3b, 3c), the piston is retracted or switched to return stroke operation.

Figure 6B:
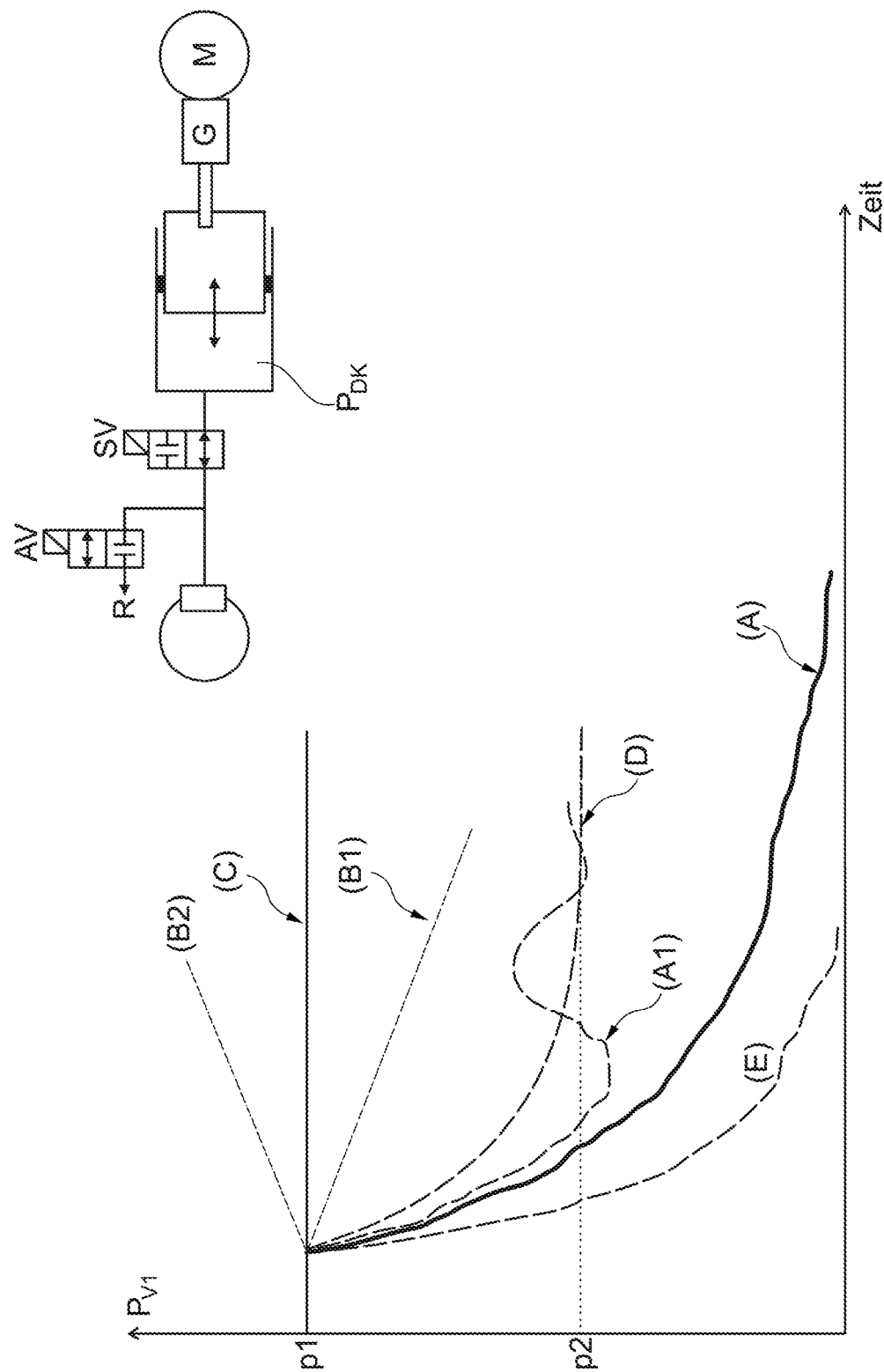

FIG. 6b describes the pressure control in the open brake circuit with the outlet valve AV open. The initial state is a pressure p1 in the consumer V1 (pV1) and pDk in the pressure chamber 2 of the piston 1. If the outlet valve AV is opened when the inlet valve EV is closed, the pressure can be reduced corresponding to the time profile (A). This method is used by standard control systems. If a pressure control is necessary, the pressure is reduced corresponding to AI via time control of the valve actuation, and the outlet valve AV is closed at a specific time when the target pressure p2 is reached. Pressure oscillations occur until the pressure adjusts to the pressure level p2. With the novel pressure control in the open brake circuit the inlet valve EV and the outlet valve AV are opened and volume is conveyed via the piston 1. In this way the desired optimum time course (D) can be realised and pressure oscillations can be prevented.

A further degree of freedom is the control with a constant pressure reduction gradient (BI). This is achieved by regulating the adjustment speed of the piston via pressure regulation. In this connection the controller is appropriately pre-controlled via a rotational speed performance characteristics diagram. The non-linear pressure reduction gradient of the outlet valve is thereby linearised. It is also possible to maintain a constant pressure constant (C) as well as a constant increase in pressure. Keeping the pressure constant is useful in diagnostic methods for valves and compensating for leakages in the system, especially in the brake circuit. A brake circuit failure due to valve leakage can be compensated in this way. Also, the pressure can be raised corresponding to the performance of the engine, even if the outlet valve is open If the pressure reduction is to be carried out quickly, there is also the possibility of simultaneously opening the inlet valve EV and the outlet valve AV and retracting the piston 1. In this way the volume in the hydraulic consumer can be reduced at the same time (E) through the inlet valve EV and the outlet valve AV, i.e. the pressure reduction gradient can be increased. This is useful as an optimisation possibility so as to use valves with small cross-sections. These are cheaper to produce.

Figure 6C:
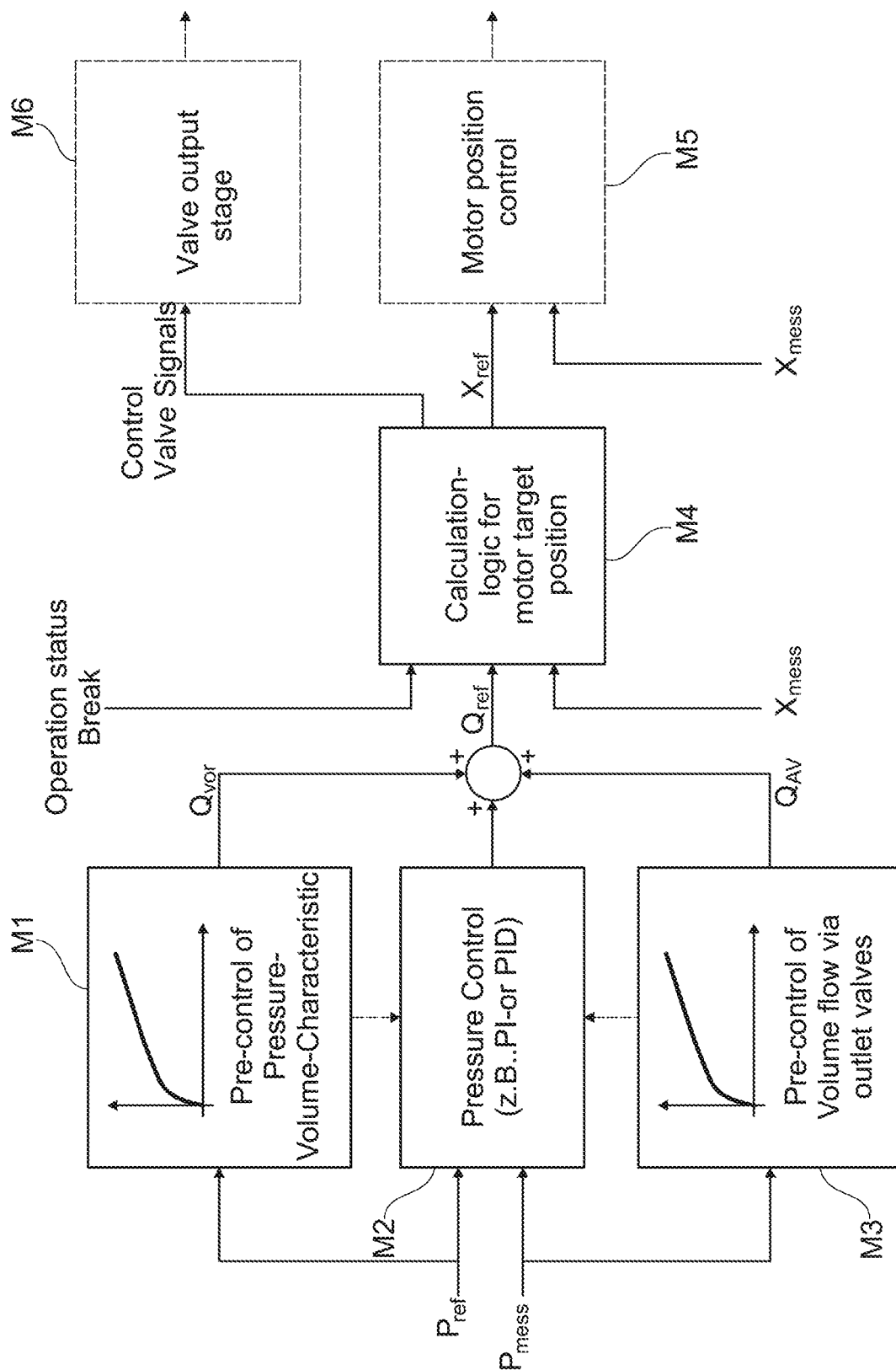

FIG. 6c shows a controller block circuit diagram that is used for the pressure control sequences described above. In this connection an electronic control and regulating unit (ECU)—not shown—is used, which is provided in all embodiments of the invention. A volume flow rate component (Qvor) is calculated from the target pressure (Pref) via the pre-control of a pressure-volume characteristic curve (M1). In addition a pre-control component QAV can be calculated via the pre-control of the volume flow via the outlet valves (M3) on the basis of the measured actual pressure in the system (pmess). The pressure regulation (M2), which is preferably designed as a PI or PID controller, calculates the actual controlled variable. It is also conceivable for the controller gains from (M2) to be changed via the working points from the pre-control blocks (M1) and (M3). The volume flow components from (M 1), (M 2) and (M 3) when totalled produce a target value for the volume flow from the pressure generating unit, which is then used as input quantity for the "Calculation logic for the motor position" (M4). (M4) calculates with aid of the further input quantity (Xmess) "measured piston position" and the operating state of the brake (pressure build-up, pressure reduction, brake force booster, ABS, . . . ) a new position target value for the piston (Xref) and the appropriate valve signals. With the aid of this logic and the subordinate modules (M5) and (M6) it is possible to achieve a very precise pressure control for pressure build-up and pressure reduction. In either case the pressure piston or the position-controlled pressure piston is used as an actuator for the pressure control. The valves of the valve stage (M6) are only digitally controlled.

The pressure control described in FIG. 6c is advantageously used in the pedal force control of the path simulator (FIG. 4b), in which the pedal force is employed via pressure volume control with open ESV and WA valve.

For all the embodiments described above, the valve VST shown in broken lines does not have to be present.

The invention claimed is:
1. A brake system for motor vehicles, including:
a main brake cylinder and a floating piston arranged in the main cylinder, wherein the floating piston is configured to hermetically separate first and second pressure chambers from one another, wherein the first pressure chamber is hydraulically connected to a first brake circuit and the second pressure chamber is hydraulically connected to a second brake circuit, a pressure medium reservoir under atmospheric pressure, wheel brakes, an electrically controllable pressure supply device configured for pressure build-up and pressure reduction in the wheel brakes, a valve block with a currentless open inlet valve/switching valve for each respective wheel brake, and with at least one outlet valve, wherein each respective wheel brake is configured to be hydraulically connected to a pressure chamber of the main brake cylinder via a respective one of the switching valves, and is also configured to be hydraulically connected to the pressure supply device directly or via one or more isolating valves, wherein each brake circuit is configured to be hydraulically connected to the pressure supply device by means of at least one controllable valve, wherein both pressure chambers are subjected to a pressure at least in normal brake booster operation both during pressure build-up and also during pressure reduction in at least one wheel brake, which corresponds to pressure generated by the pressure supply device, and wherein in braking situations, in which pressure change takes place in at least one wheel brake with high dynamics, the pressure change takes place in the at least one wheel brake by means of a volume control of the pressure supply device, and in at least one other wheel brake, a pressure reduction takes place, simultaneously, via the at least one outlet valve.

2. The brake system according to claim 1, further including a pedal actuating unit connected to a plunger, wherein pressure in the second pressure chamber acts on the plunger to generate a pedal reaction force, and/or wherein the pedal actuating unit is configured to adjust a piston configured to generate a pressure in a third pressure chamber.

3. The brake system according to claim 2, wherein the third and the second pressure chambers are configured to be hydraulically connected to one another, in a fall-back situation, by means of a switching valve.

4. The brake system according to claim 2, wherein hydraulic medium under pressure in the second pressure chamber exerts an axial force on the plunger, wherein the plunger projects into the second pressure chamber, and thereby on the pedal actuating unit, wherein restoring force acting on the brake actuating unit is enabled to be controlled or regulated via control of the pressure in the second pressure chamber or to be switched off by closing an isolating valve.

5. The brake system according to claim 4, wherein the third pressure chamber is in communication with the pressure medium reservoir by means of a hydraulic connecting line, wherein this connecting line is enabled to be closed by means of an isolating valve.

6. The brake system according to claim 4, wherein the plunger has a diameter smaller than 10 mm, and greater than or equal to 3 mm.

7. The brake system according to claim 2, further including a special valve configured to be closed to through flow from the pressure generating unit to the reservoir, wherein the special valve is configured to be used for diagnosis of seals between the second and third pressure chambers and also of a path simulator piston by means of pressure control through the pressure supply device.

8. The brake system according to claim 1, wherein the main brake cylinder comprises a radially extending channel of its cylinder wall, which opens out into the first pressure chamber, wherein a mouth opening of the channel is arranged to be closed by the floating piston as soon as the floating piston is adjusted from its normal position by the diameter of the mouth opening, and wherein the channel is hydraulically connected to a pressure chamber of the pressure supply device.

9. The brake system according to claim 8, further including a mechanical stop arranged in the main brake cylinder, wherein a spring is configured to exert a force on the floating piston in a direction of the stop, and wherein the floating piston is in its normal position when it rests against the stop.

10. The brake system according to claim 8, wherein a pressure build-up or pressure reduction takes place at least in the first brake circuit via at least one open switching valve through the channel into the first pressure chamber and also via a sniffing hole, wherein the floating piston is in its normal position.

11. The brake system according to claim 1, further including a pressure sensor configured to determine pressure provided in only one brake circuit, and a control device configured to determine a pressure in the first pressure chamber and in the first brake circuit by means of a measured phase current of a drive of the pressure supply device, wherein the determined pressures are used for diagnostic purposes or for pressure control.

12. The brake system according to claim 1, wherein the brake system has only one outlet valve for only one wheel brake, or an outlet valve of the at least one outlet valve is assigned to several or all wheel brakes, wherein the only one output valve or the of the at least one outlet valve is arranged in a hydraulic connecting line that connects an associated wheel brake to the reservoir, and which is in direct hydraulic connection with a hydraulic connecting line connecting the associated wheel brake to the respective switching valve associated with the associated wheel brake.

13. The brake system according to claim 1, wherein a switchable isolating valve (TV1) is arranged for optional shut-off of a hydraulic connecting line between wheel brakes of the first brake circuit and the pressure supply device, wherein a constant hydraulic connection exists between the radially extending channel and the pressure supply device.

14. The brake system according to claim 1, wherein only one outlet valve per brake circuit is provided.

15. The brake system according to claim 1, wherein the pressure supply device comprises a piston that is driven by a transmission and an electric motor, wherein the piston delimits at least one working chamber.

16. The brake system according to claim 15, wherein pressure reduction takes place via an open valve during a forward stroke of the piston of the pressure supply device with corresponding valve switching of valves, wherein in the pressure reduction, pressure measured in the brake circuits is used for control.

17. The brake system according to claim 15, wherein the piston of the pressure supply device hermetically separates two pressure chambers from one another, wherein both pressure chambers are configured to be connected to one or another of the first and second brake circuits by means of the switching valves and/or via the main brake cylinder for pressure build-up or pressure reduction.

18. The brake system according to claim 17, wherein the piston is a double-stroke piston that separates two pressure chambers, wherein the two pressure chambers are enabled to be hydraulically connected by means of connecting lines, and wherein a pressure equalisation for pressure control with different hydraulic working surfaces and positioning of the double stroke piston takes place between the pressure chambers by opening valves arranged in the connecting lines.

19. The brake system according to claim 1, further including:
a switchable valve is arranged in a hydraulic connecting line and configured to enable optional closure of the hydraulic connecting line, wherein the hydraulic connecting line connects a working chamber of the pressure supply device to a reservoir for hydraulic medium, which is formed by a piston cylinder system with a working chamber and a spring-loaded piston, and
at least one hydraulic connecting line configured to connect an outlet of one or more outlet valve or valves to the reservoir.

20. The brake system according to claim 19, wherein the hydraulic medium is stored under pressure in the reservoir and serves to fill the working chamber of the pressure supply device.

21. The brake system according to claim 1, wherein the pressure supply device comprises a differential piston that has two working surfaces for axial limitation of two pressure chambers,
wherein either:
(a) the two pressure chambers are connected to one another via a hydraulic connecting line configured to be closed by means of a switchable valve, or
(b) the first brake chamber is connected to the second brake circuit by means of a hydraulic connecting line, and the second brake chamber is hydraulically connected by means of a hydraulic connecting line to the first brake circuit, and a switchable valve is arranged in one or switchable valves are arranged in both hydraulic connecting lines to enable optional closure or opening of the hydraulic connecting line or hydraulic connecting lines.

22. The brake system according to claim 21, wherein a pressure reduction takes place in the reservoir via a path-controlled stroke of the piston of the pressure supply device or via a connecting line of a pressure chamber of the piston, where the piston is a double stroke piston, with at least one pressure relief valve open, wherein a control device is configured to use pressure measured in a respective brake circuit or a calculated pressure for pressure reduction control.

23. The brake system according to claim 22, wherein the pressure reduction takes place at high pressures, defined as >100 bar, up to pressures in a region close to a blocking pressure in normal operation via pressure or time control of a pressure relief valve with optionally simultaneous or time-delayed path control of the double stroke piston in forward stroke operation and subsequent pressure reduction up to atmospheric pressure via pressure volume control in return stroke operation of the double stroke piston.

24. The brake system according to claim 22, wherein a pressure build-up in one of the first and second brake circuits and a pressure reduction in the other of the first and second brake circuits takes place simultaneously by means of both the first and second chambers of the double stroke piston, wherein pressure change in at least one wheel brake takes place by means of path control or volume control of the double stroke piston and corresponding control of the switching valves.

25. The brake system according to claim 1, wherein pressure reduction takes place in a given wheel brake via a pressure chamber into a reservoir, wherein valves arranged in a hydraulic connection between the wheel brake and a reservoir are opened, wherein at least one of the valves is opened at a predetermined pressure reduction, wherein pressure reduction in the brake circuits is measured via a pressure transducer and is controlled.

26. The brake system according to claim 25, wherein a pressure build-up in another wheel brake by means of the pressure supply device, wherein the pressure supply device is volume-controlled, takes place during time-controlled pressure reduction in the given wheel brake.

27. The brake system according to claim 1, further including one or more locking elements configured to lock the floating piston of the main brake cylinder or by means of which, in a fall-back situation or with special functions in an ABS operation, hydraulic connections between the second pressure chamber and the pressure supply device and between the first pressure chamber and the first brake circuit are enabled to be interrupted.

28. The brake system according to claim 1, wherein the main brake cylinder has a first piston-cylinder unit with a piston, wherein the piston arranged to hermetically separate the two pressure chambers from one another, and further including a first plunger fastened or formed on the piston, wherein a free end of the first plunger projects from a cylinder housing, wherein the brake actuating unit is in mechanical connection with a second plunger, wherein a free end of the second plunger is held at a distance from the free end of the first plunger and is configured to displace the first plunger in a fall-back situation of the second plunger.

29. The brake system according to claim 1, wherein a control device is configured to monitor volume management of the brake circuits and to prevent a piston of the control device from abutting against an axial stop of a cylinder of the pressure supply device by corresponding path control of the piston.

30. The brake system according to claim 1, wherein, in anti-lock braking system (ABS) operation, the floating piston of the main brake cylinder is adjustable into a position by means of a position sensor or via evaluation of volume delivery by corresponding switching of one or more valves.

31. The brake system according to claim 1, wherein the control device is configured to check a sealing function of the floating piston of the main brake cylinder when a vehicle incorporating the brake system is stationary, wherein the control device uses an existing brake pressure in a pressure chamber of the main brake cylinder without further adjustment of a piston of the pressure supply device.

32. The brake system according to claim 1, wherein the isolating valves are designed for high flow rates and low differential pressures.

33. The brake system according to claim 32, wherein the control unit is configured to generate, by means of the pressure supply device, before or during opening of at least one of the isolating valves, a pressure in a pressure chamber of the pressure supply device, by means of adjusting a piston of the pressure supply device, the pressure in the pressure chamber of the pressure supply device being so large that a sufficiently small differential pressure is established at the at least one isolating valve to be opened.

34. A method of testing tightness and mobility of a floating piston of a main brake cylinder of a brake system with
the main brake cylinder and the floating piston arranged in the main cylinder, wherein the floating piston is configured to hermetically separate first and second pressure chambers from one another, wherein the first pressure chamber is hydraulically connected to a first brake circuit and the second pressure chamber is hydraulically connected to a second brake circuit, a pressure medium reservoir under atmospheric pressure, wheel brakes, an electrically controllable pressure supply device configured for pressure build-up and pressure reduction in the wheel brakes, a valve block with a currentless open inlet valve/switching valve for each respective wheel brake, and with at least one outlet valve, wherein each respective wheel brake is configured to be hydraulically connected to a pressure chamber of the main brake cylinder via a respective one of the switching valves, and is also configured to be hydraulically connected to the pressure supply device directly or via one or more isolating valves, wherein each brake circuit is configured to be hydraulically connected to the pressure supply device by means of at least one controllable valve, wherein the main brake cylinder has a radially extending channel in its cylinder wall, which opens out in the first pressure chamber, wherein a mouth opening of the channel is closed by the floating piston when the floating piston as is displaced from its normal position by an amount at least equal to a diameter of the mouth, wherein the channel is in hydraulic communication with a pressure chamber of the pressure supply device, wherein a mechanical stop is arranged in the main brake cylinder and a spring exerts a force on the floating piston in a direction of the stop, and wherein the floating piston is in its normal position when it rests against the stop, the method including:

a. building up a pressure in the first and second pressure chambers via the pressure generating unit, and switching valves such that a pressure in the second pressure chamber is greater than a pressure in the first pressure chamber, and moving the floating piston to close the channel;

b. generating a test path profile of the floating piston and/or a pressure volume profile over time for one of the first or second pressure chambers of the main brake cylinder by means of the pressure supply device, to result in a pressure profile; and c. comparing and evaluating, based on a signal of a pressure transducer, the pressure profile with a target value profile with the inlet/switching valves associated with the wheel brakes open.

35. The method according to claim 34, wherein the reducing the pressure takes place at pressures greater than or equal to 100 bar and comprises:

a. reducing pressure in a first phase via pressure control and pressure measurement via a pressure relief valve coupled between the pressure medium reservoir and the pressure supply device and a corresponding opening of at least one of the inlet/switching valves to a respective wheel brake;

b. driving a double stroke piston of the pressure supply device in a forward stroke operation with simultaneous opening of a valve or valves that connect a first pressure chamber of the pressure supply device to a second pressure chamber of the pressure supply device;

c. further reducing pressure by means of the double stroke piston in a return stroke operation via pressure volume control with pressure measurement via the pressure transducer; and d. positioning the double stroke piston in a starting position, corresponding to an initial position for atmospheric pressure, and subsequent conveying of hydraulic medium into the pressure supply device via non-return valves.

36. The method according to claim 35, wherein at least one outlet valve is used in reducing pressure in the wheel brakes, wherein the pressure chambers of the double stroke piston of the pressure supply device are connected to the reservoir only via one or more non-return valves, and wherein a volume of the second pressure chamber of the double stroke piston during pressure reduction counteracts a volume of the wheel brakes.

37. The method according to claim 36, further comprising checking for leakage of the at least one outlet valve by diagnosis, wherein for this purpose the double stroke piston of the pressure supply device, especially at low pressure, is held still in a position for a predefined time, on connection to the respective brake circuit associated with a respective one of the at least one outlet valve to be checked and monitoring for a possible pressure change in the respective brake circuit by means of a pressure transducer.

38. The method according to claim 34, wherein a check of seals of the floating piston of the main brake cylinder is carried out during brake actuation in a brake force booster amplifier mode.

39. A method of testing tightness and mobility of the floating piston of a main brake cylinder of a brake system with the main brake cylinder and the floating piston arranged in the main cylinder, wherein the floating piston is configured to hermetically separate first and second pressure chambers from one another, wherein the first pressure chamber is hydraulically connected to a first brake circuit and the second pressure chamber is hydraulically connected to a second brake circuit, a pressure medium reservoir under atmospheric pressure, wheel brakes, an electrically controllable pressure supply device configured for pressure build-up and pressure reduction in the wheel brakes, a valve block with a currentless open inlet valve/switching valve for each respective wheel brake, and with at least one outlet valve, wherein each respective wheel brake is configured to be hydraulically connected to a pressure chamber of the main brake cylinder via a respective one of the switching valves, and is also configured to be hydraulically connected to the pressure supply device directly or via one or more isolating valves, wherein each brake circuit is configured to be hydraulically connected to the pressure supply device by means of at least one controllable valve, wherein the method comprises:

a) storing a pressure in the second brake circuit by closing the inlet/switching valves associated with the second brake circuit during a parking stop, when a vehicle incorporating the brake system is stationary;

b) following the storing, reducing a pressure in the first brake circuit to 0 to 1 bar by means of the pressure supply device;

c) following the reducing the pressure in the first brake circuit, blocking the pressure supply device unit in such a way that a piston movement of a piston of the pressure supply device no longer takes place, wherein the control device closes one of the isolating valves disposed between the pressure supply device and the second brake circuit;

d) opening the inlet/switching valves associated with the second brake circuit, following the blocking the pressure supply device, whereby the floating piston moves on account of pressure on its rear side, and as a result, building up the pressure in the first brake circuit until a pressure equilibrium is established between the first and second brake circuits; and e) measuring the pressure in one of the first or second brake circuits by means of a pressure sensor in one of the first or second brake circuits, and evaluating a resulting pressure profile.

\* \* \* \* \*